(12) United States Patent
Yamamoto et al.

(10) Patent No.: US 6,333,607 B1
(45) Date of Patent: Dec. 25, 2001

(54) HIGH VOLTAGE DISCHARGE LAMP DEVICE

(75) Inventors: Noboru Yamamoto; Kenji Yoneima, both of Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/576,616

(22) Filed: May 22, 2000

Related U.S. Application Data

(62) Division of application No. 09/078,603, filed on May 14, 1998.

(30) Foreign Application Priority Data

| May 16, 1997 | (JP) | 9-127677 |
|---|---|---|
| May 16, 1997 | (JP) | 9-127678 |
| May 16, 1997 | (JP) | 9-127679 |
| May 16, 1997 | (JP) | 9-127680 |
| May 16, 1997 | (JP) | 9-127681 |
| May 16, 1997 | (JP) | 9-127682 |
| May 16, 1997 | (JP) | 9-127683 |
| May 16, 1997 | (JP) | 9-127684 |
| May 16, 1997 | (JP) | 9-127685 |
| May 16, 1997 | (JP) | 9-127686 |
| May 16, 1997 | (JP) | 9-127687 |
| May 16, 1997 | (JP) | 9-127688 |
| May 16, 1997 | (JP) | 9-127689 |

(51) Int. Cl.$^7$ .................................................. G05F 1/00
(52) U.S. Cl. ..................... 315/307; 315/308; 315/291; 315/DIG. 7
(58) Field of Search ....................... 315/307, 308, 315/241 R, 224, 291, 219, DIG. 7, 209 CD, 209 SC

(56) References Cited

U.S. PATENT DOCUMENTS

| 3,889,152 | 6/1975 | Bondine, Jr. et al. ............... 315/205 |
|---|---|---|
| 4,527,213 | 7/1985 | Arizumi ................................. 361/56 |
| 4,573,099 | 2/1986 | Ganesan et al. ...................... 361/56 |
| 4,873,471 | 10/1989 | Dean et al. .......................... 315/308 |
| 5,384,518 | 1/1995 | Kido et al. ............................ 315/225 |
| 5,396,152 | 3/1995 | Bonigk ........................... 3115/241 R |
| 5,485,059 | * 1/1996 | Yamashita et al. .................. 315/307 |
| 5,486,740 | 1/1996 | Yamashita ............................. 315/308 |
| 5,600,211 | 2/1997 | Luger ................................... 315/307 |
| 5,629,588 | * 5/1997 | Oda et al. ............................ 315/308 |
| 5,654,611 | 8/1997 | Yamamoto ........................... 315/308 |
| 5,666,279 | 9/1997 | Takehara et al. ...................... 363/95 |
| 5,706,185 | 1/1998 | Toyama et al. ........................ 363/21 |
| 5,751,121 | * 5/1998 | Toyama et al. ...................... 315/307 |
| 5,880,563 | 3/1999 | Toyama et al. ...................... 315/225 |
| 5,907,224 | 5/1999 | Yamashita et al. .................. 345/308 |
| 5,910,712 | * 6/1999 | Toyama .............................. 315/307 |
| 5,925,983 | * 7/1999 | Toda et al. ........................... 315/119 |
| 5,936,361 | * 8/1999 | Yamashita et al. .................. 315/308 |

FOREIGN PATENT DOCUMENTS

| 4031288 C1 | 10/1990 | (DE) . |
|---|---|---|
| 4322139 A1 | 1/1994 | (DE) . |
| 4420182 A1 | 6/1994 | (DE) . |
| 19533103 A1 | 3/1996 | (DE) . |
| 19537876 A1 | 4/1996 | (DE) . |
| 19626101 A1 | 1/1997 | (DE) . |
| 19713935 A1 | 10/1997 | (DE) . |

(List continued on next page.)

*Primary Examiner*—Don Wong
*Assistant Examiner*—Tuyet T. Vo
(74) *Attorney, Agent, or Firm*—Nixon & Vanderhye P.C.

(57) ABSTRACT

A discharge lamp control circuit for a vehicular lamp uses a starting circuit capacitor that is charged by the same high voltage generator used later as the lamp's power source after it is turned on. As a result, no separate dedicted starting transformer is necessary. Further, a thyristor and diode are used in the starting circuit in place of a spark-gap for initially activating the discharge lamp.

19 Claims, 19 Drawing Sheets

FOREIGN PATENT DOCUMENTS

| | | |
|---|---|---|
| 0508526 A1 | 10/1992 | (EP) . |
| 0615403 A2 | 9/1994 | (EP) . |
| 0684755 A1 | 11/1995 | (EP) . |
| 0762809 A2 | 3/1997 | (EP) . |
| 2686762 | 1/1992 | (FR) . |
| A-2 686 762 | 1/1992 | (FR) . |
| 2738682 | 9/1995 | (FR) . |
| 22928743 A | 3/1996 | (GB) . |
| A-62-281034 | 12/1987 | (JP) . |
| A-64-15675 | 1/1989 | (JP) . |
| A-3-289381 | 12/1991 | (JP) . |
| A-5-13186 | 1/1993 | (JP) . |
| A-5-226088 | 9/1993 | (JP) . |
| A-5-234689 | 9/1993 | (JP) . |
| A-5-284080 | 10/1993 | (JP) . |
| A-6-111988 | 4/1994 | (JP) . |
| A-6-290887 | 10/1994 | (JP) . |
| A-7-142182 | 6/1995 | (JP) . |
| A7-192878 | 7/1995 | (JP) . |
| A-7-235387 | 9/1995 | (JP) . |
| A-7-272880 | 10/1995 | (JP) . |
| A-8-185991 | 7/1996 | (JP) . |
| A-8-223935 | 8/1996 | (JP) . |
| A-8-298191 | 11/1996 | (JP) . |
| A-9-7784 | 1/1997 | (JP) . |
| A-9-50893 | 2/1997 | (JP) . |
| A-9-65652 | 3/1997 | (JP) . |
| A-9-180888 | 7/1997 | (JP) . |
| A-9-306684 | 11/1997 | (JP) . |
| WO 88/09108 | 11/1988 | (WO) . |
| WO 92/10920 | 6/1992 | (WO) . |
| WO 96/27277 | 9/1996 | (WO) . |

* cited by examiner

TIMING SIGNAL

HIGH VOLTAGE DISCHARGE LAMP DEVICE

CROSS REFERENCE TO RELATED APPLICATION

This is a divisional of application Ser. No. 09/078,603, filed May 14, 1998, now pending, the entire content of which is hereby incorporated by reference in this application.

BACKGROUND OF THE INVENTION

1. Field of the Invention

The present invention relates to controlling a high voltage discharge lamp which is preferably used particularly in a vehicle headlight.

2. Description of Related Art

A discharge lamp device for turning on a high voltage discharge lamp (lamp) applied to a headlight for a vehicle is proposed in JP-A 9-180888 (U.S. Ser. No. 08/756,556 and now U.S. Pat. No. 5,751,121) or JP-A 9-306684.

In the proposed device, as shown in FIG. 26, the voltage of a vehicular battery 300 is transformed into high voltage by a primary transformer winding 302a and a secondary transformer winding 302b installed to the side of a starting circuit 301 having a capacitor 303 that is charged by the transformed high voltage. Further, when the charge voltage of capacitor 303 reaches a set voltage or higher, discharge is carried out at discharge gap 304, the charge voltage of capacitor 303 is further increased by the discharge through transformer windings 305a, 305b and high voltage is applied to lamp 306. Thereby, lamp 306 is turned on.

Further, lamp 306 is maintained turned on by supplying predetermined power from vehicular battery 300 on the primary side to a secondary side transformer winding 302c installed for using use in a direct current power source circuit 307 separately from starting circuit 301. At this occasion, in order to turn on lamp 306 by alternating current, the direction of discharge current is alternately inverted by inverter circuit 310 having an H-bridge circuit 309 comprising four MOS transistors 309a—309d.

Further, primary current I flowing in the primary side transformer 302a is controlled by MOS transistor 311 for the primary which is a semiconductor switching element. On/off switching of MOS transistor 311 is controlled by a PWM control circuit 312. The PWM control circuit 312 carries out a duty-cycle control based on lamp voltage VL applied to lamp 306 and lamp current IL flowing in lamp 306 and controls power supply to the secondary side in accordance with a condition (for example, electrode temperature) of lamp 306.

However, there occurs a problem of limited life of gap 304 since gap 304 is used as a switching element for turning on lamp 306.

For example, when the gap interval is shortened by foreign matter adhering to gap 304, there occurs a problem of lessening turn-on performance of lamp 306 since the discharge is carried out at gap 304 before a predetermined discharge voltage is achieved since the discharge voltage is lowered. Meanwhile, when the gap interval is lengthened by wear of gap 304, there occurs a problem where the gap discharge cannot be carried out since the discharge voltage is made to high.

Further, there occurs a problem where seal gas inside of gap 306 is deteriorated with the number of times of use of the lamp 306.

Meanwhile, there also occurs a problem where cost is increased since the two transformers windings 302b and 302c are used for starting circuit 301 and the direct current power source circuit 307.

SUMMARY OF THE INVENTION

It is therefore an object of the present invention to provide a lamp discharge device which provides stable operation at low cost.

According to one aspect of the present invention, a capacitor in a starting circuit is charged based on the voltage of a direct current power source which has been transformed into high voltage by a transformer. The voltage of the direct current power source which has been transformed into high voltage by the transformer is sufficiently high that it is sufficient for charging the capacitor of the starting circuit. In this way, by charging the capacitor by the transformed high voltage, a single transformer can commonly be used for both of the starting circuit and the direct current power source circuit.

Other objects, features and advantages of the present invention will become more apparent from the following detailed description.

DETAILED DESCRIPTION OF THE PREFERRED EMBODIMENT (First Embodiment)

Figure 1:
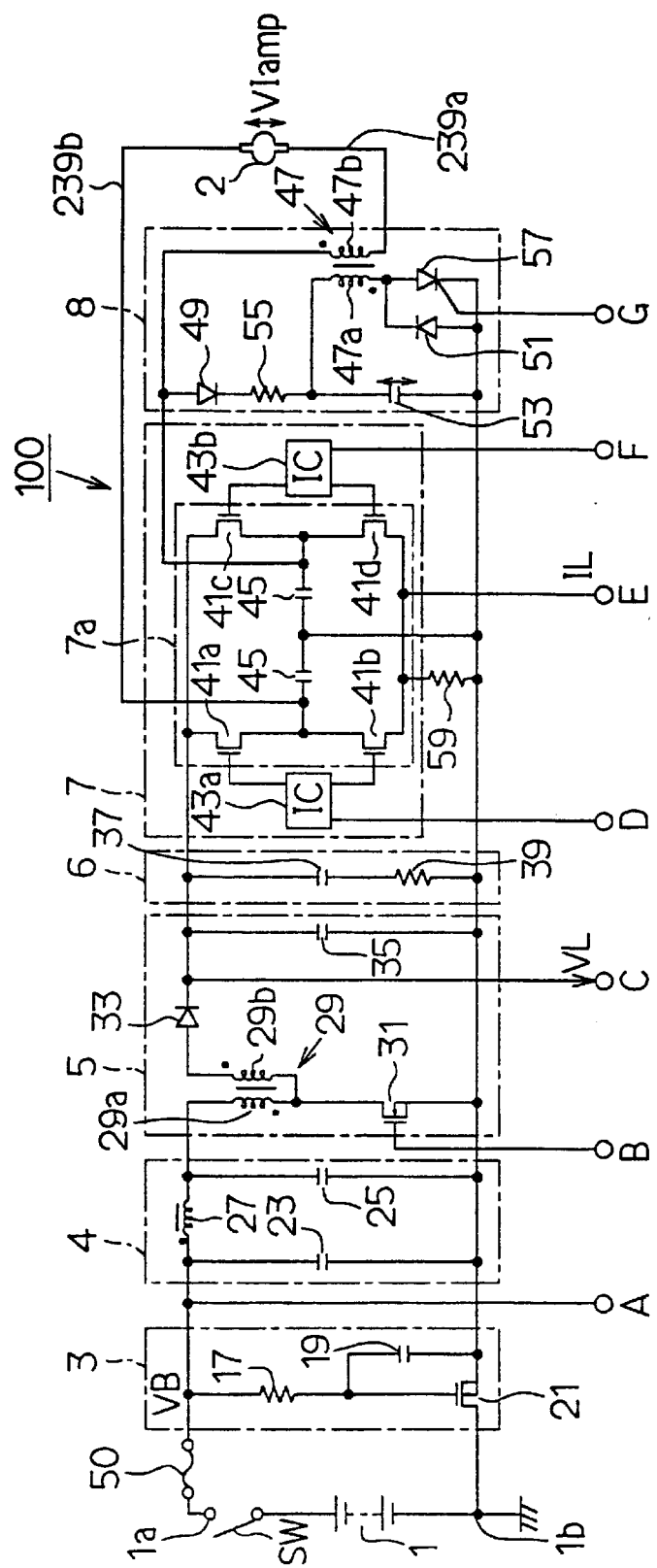
FIG. 1 is a circuit diagram of a discharge lamp device according to a first embodiment of the present invention.
Figure 2:
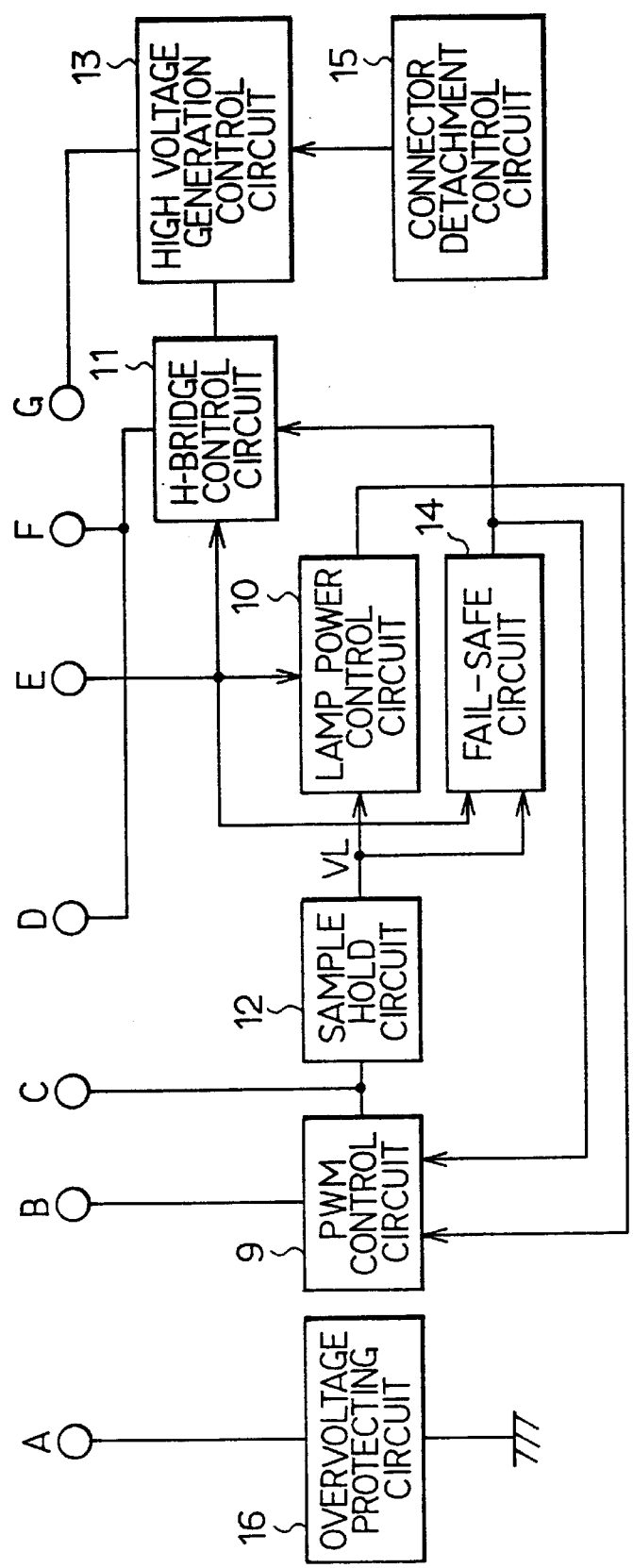
FIG. 2 is a block diagram showing a control system of the discharge lamp device shown in FIG. 1.

According to the first embodiment, a discharge lamp device is applied to a headlight for a vehicle and constructed as shown in FIGS. 1 and 2.

In FIG. 1, numeral 1 designates a direct current power source (battery) having a rated voltage VB (12 V), notation 1a designates a power source terminal, notation 1b designates a ground terminal and numeral 2 designates a high voltage discharge lamp (lamp) of a metal halide type or the like that is a headlight for a vehicle. Notation SW designates an on/off switch for setting to turn on or off the lamp 2 by operation of a user. Numeral 50 designates a fuse that is melted and cut when overcurrent flows in the discharge lamp device 100.

As shown in FIG. 1, the discharge device 100 is provided with circuit function units of a reverse connection protecting circuit 3, a smoothing circuit 4, a direct current power source circuit 5 having a flyback transformer 29, a takeover circuit 6, an inverter circuit 7 including an H-bridge circuit 7a, a starting circuit 8 and the like.

As shown in FIG. 2, according to the embodiment, there are installed, as control circuits for controlling the circuit function units, a PWM (Pulse Width Modulation) control circuit 9, a lamp power control circuit 10 for controlling lamp power to a desired power based on lamp voltage VL and lamp current IL, mentioned later, an H-bridge control circuit 11 for controlling the H-bridge circuit 7a and the like.

Further, according to the embodiment, there are provided, as other control circuits a sample hold circuit 12 for sampling and holding the lamp voltage VL at predetermined timings, a high voltage generation control circuit 13 for bringing the lamp 2 into dielectric breakdown between electrodes by applying high voltage on the lamp 2 while controlling the starting circuit 8, a fail-safe circuit 14 for controlling the H-bridge circuit 7a through the H-bridge control circuit 11 when the discharge lamp device 100 is brought into an abnormal state, mentioned later and a connector detachment detecting circuit 15 for detecting detachment of a connector 35 of the lamp 2.

Further, although power for driving the respective control circuits 9–15 is supplied based on the battery voltage VB or the like, the discharge lamp device 100 is also provided with an overvoltage protecting circuit 16 for protecting the respective control circuits 9–15 against overvoltage when the primary side voltage becomes the overvoltage.

Here, an explanation will firstly be given of an outline of operation of turning on the discharge lamp device 100. When the on/off switch SW is turned on, the battery voltage VB is made to rise by the flyback transformer 29 by which a capacitor 53 of the starting circuit 8 is charged through the H-bridge circuit 7a. Further, when the capacitor 53 is charged, electric charge charged in the starting circuit 8 is discharged, voltage further elevated by a transformer 47 is applied to the lamp 2 and the lamp 2 is turned on through dielectric breakdown between electrodes.

Thereafter, when the lamp 2 is turned on, the lamp 2 is turned on by alternating current by alternately switching polarity of discharge voltage (direction of discharge current) to the lamp 2 by the H-bridge circuit 7a.

The reverse connection protecting circuit 3 comprises a resistor 17, a capacitor 19 and an MOS transistor 21. The reverse connection protecting circuit 3 protects the MOS transistor 21 when high voltage of negative polarity is generated at the power source terminal. Further, it prevents the fuse 50 from melting and cutting in the case of reverse connection where the battery 1 is attached to a vehicle with polarities reversed.

The smoothing circuit 4 smoothes voltage generated at the power source terminal 1a which is a capacitor input type smoothing circuit (choke input type smoothing circuit) comprising capacitors 23 and 25 and a coil 27.

The direct current power source circuit 5 is provided with the flyback transformer 29 where both of the primary side and the secondary side are constituted by windings. The flyback transformer 29 is provided with a primary winding 29a arranged on the side of the battery and a secondary winding 29b arranged on the side of the lamp 2. Further, as shown in FIG. 1, according to the flyback transformer 29, the primary winding 29a and the secondary winding 29b are electrically conductible. The direct current power source circuit 5 is installed with an MOS transistor 31 switching of which is controlled by the PWM circuit 9. The primary current of the primary winding 29a is controlled by the MOS transistor 31.

That is, according to the flyback transformer 29, when the MOS transistor 31 is turned on, the primary current flows in the primary winding 29a by which energy is stored in the primary winding 29a. Further, according to the flyback transformer 29, when the MOS transistor 31 is turned off, the energy of the primary winding 29a is supplied to the secondary winding 29b.

Further, the secondary winding 29b of the direct current power source circuit 5 is installed with a diode 33 for rectifying current and a capacitor 35 for smoothing current.

The takeover circuit 6 comprises a capacitor 37 and a resistor 39. When the on/off switch SW is turned on, electric charge is charged to the capacitor 37. The takeover circuit 6 is for swiftly shifting to arc discharge after dielectric breakdown is caused between electrodes of the lamp 2 by the starting circuit 8.

The inverter circuit 7 is installed on the side of the secondary winding 29b of the flyback transformer 29 which turns on the lamp 2 by alternating current by transforming power from the battery 1 into that of alternating current.

The H-bridge circuit 7a constituting the inventer circuit 7 inverts alternately the direction of discharge current at the lamp 2. The H-bridge circuit 7a includes four MOS transistors 41a–41d constituting a plurality of semiconductor switching elements for bridge arranged in an H-bridge shape. The four MOS transistors 41a–41d are controlled by bridge drive circuits (IC elements, in this example, IC elements) designated by notations 43a and 43b in the figure.

The bridge control circuit 11 controls to switch the MOS transistors 41b and 41c on a diagonal line into an ON state when the MOS transistors 41a and 41d on a diagonal line in the H-bridge circuit 7a are brought into an OFF state and controls to switch the MOS transistors 41a and 41d into the OFF state when the MOS transistors 41b and 41c are brought into the ON state by controlling the IC elements 43a and 43b. As a result, the direction of the discharge current at the lamp 2 is alternately switched. In other words, the lamp 2 is turned on by alternating current by inverting the polarity of voltage (discharge voltage) applied to the lamp 2.

The H-bridge circuit 7a turns on or off the MOS transistors 41a–41d at a long constant period when the lamp 2 is started to turn on and thereafter, it turns on or off the MOS transistors 41a–41d at a short constant period. Numeral 45 designates capacitors for protecting the H-bridge circuit 7a against high voltage pulse generated in starting to turn on the lamp 2.

The starting circuit 8 is for starting to turn on the lamp 2 which is installed between an intermediary potential point of the H-bridge circuit 7a and the ground terminal 1b. The starting circuit 8 comprises a transformer 47 comprising a primary winding 47a and a secondary winding 47b, diodes 49 and 51, a capacitor 53, a resistor 55 and a thyristor 57 which is a one-directional semiconductor element.

The thyristor 57 is turned off when the on/off switch SW is turned on by which the capacitor 53 starts charging. Thereafter, the thyristor 57 is turned on by the high voltage generation control circuit 13. As a result, the capacitor 53 starts discharging. Then, energy stored in the capacitor 53 is transformed into the high voltage through the transformer 47 by which the high voltage is applied to the lamp 2. As a result, the lamp 2 is turned on through dielectric breakdown between electrodes.

The PWM control circuit 9 controls time periods of turning on and off the MOS transistor 31, that is, the duty ratio by making variable a threshold level with regard to a sawtooth wave.

The lamp power control circuit 10 controls the lamp power to a desired value based on the lamp current IL and the lamp voltage VL sampled and held by the sample hold circuit 12. the lamp current IL is detected by a resistor 59 for current detection installed to the H-bridge circuit 7a.

The lamp power control circuit 10 elevates electrode temperature with a large value (for example, 75 W) of the lamp power, gradually lowers the lamp power when the electrode temperature is gradually elevated and controls constant the lamp power to a predetermined value (35 W) when the lamp 2 is brought into a stable state, since when the electrode temperature of the lamp 2 is low in starting to turn on the lamp 2, the lamp 2 is liable to put off.

Further, the lamp voltage VL is minimized immediately after the lamp voltage VL is elevated to high voltage (for example 400 V) and the lamp 2 is started to turn on and thereafter, the lamp voltage VL is gradually increased. Meanwhile, the lamp current IL is gradually reduced contrary to the lamp voltage VL immediately after the lamp 2 is started to turn on.

Further, in order to carry out such a lamp power control, the PWM control circuit 9 controls the lamp power by making variable the duty ratio of turning on or off the MOS transistor 31 by receiving an instruction signal from the lamp power control circuit 10.

The sample hold circuit 12 masks a transient voltage of the lamp voltage VL generated in switching the H-bridge circuit 7a and makes the lamp power control circuit 10 control accurately.

The fail-safe circuit 14 stops control of the PWM control circuit 9 and turns off conduction of all of the MOS transistors 41a–41d of the H-bridge circuit 7a. All of the control circuits 9–15 are installed in an integrated circuit.

(Starting Circuit 8)

Figure 3:
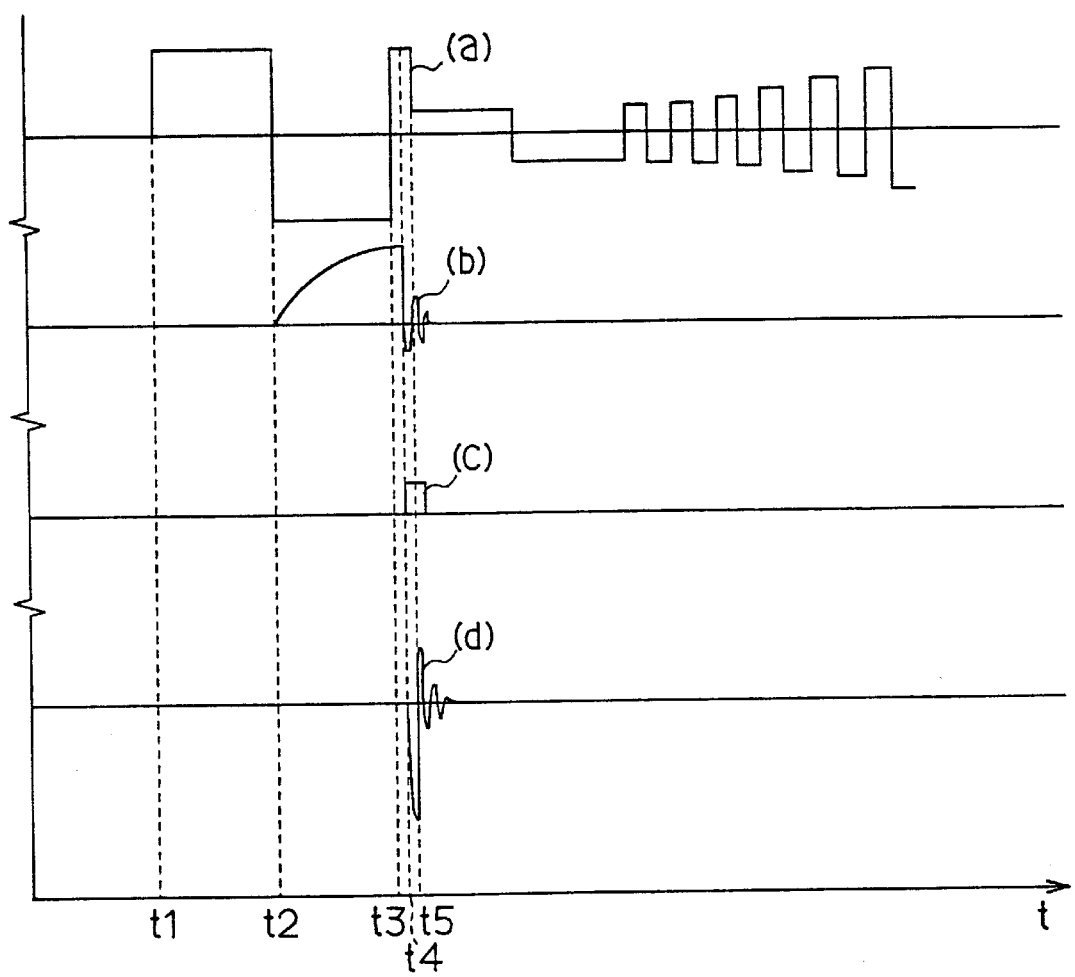
FIG. 3 is a time chart showing waveforms at respective points of a starting circuit according to the embodiment.

The starting circuit 8 starts to turn on the lamp 2 and is installed between the intermediary potential point of the H-bridge circuit 7a and the ground terminal 1b. It operates as shown in FIG. 3. In FIG. 3, (a) indicates both end voltage Vlamp of the lamp 2, (b) indicates charge voltage Vc of the capacitor 53, (c) indicates a gate drive signal outputted to the gate of the thyristor 57 and (d) indicates high voltage generated at the secondary winding 47b.

When the on/off switch SW is turned on, on/off switch of the MOS transistors 41a–41d constituting the H-bridge circuit 7a is started (time point t1 in FIG. 3). When the MOS transistors 41a and 41d are turned on, a low level signal is outputted as the gate drive signal and the thyristor 57 is brought into an OFF state. Thereby, the capacitor 53 starts charging (time point t2 of FIG. 3). After sufficiently charging the capacitor 53 during the time period of turning on the MOS transistors 41a and 41d, the MOS transistors 41a and 41d are turned off and the MOS transistors 41b and 41c are turned on (time point t3 of FIG. 3).

Further, when the gate drive signal of the thyristor 57 is changed to a high level signal, the thyristor 57 is turned on, current flows and high voltage is generated at the secondary winding 47b of the transformer 47 (time point t4 of FIG. 3). The high voltage is applied to the lamp 2, dielectric breakdown is caused between electrodes of the lamp 2 and the lamp 2 starts turning on (time point t5 of FIG. 3).

Further, by connecting the diode 51 in parallel with the thyristor 57, LC resonance is caused by the capacitor 53 and the primary winding 47a when the thyristor 57 is turned on. When dielectric breakdown is caused between electrodes of the lamp 2 by the high voltage from the secondary winding 47b, spark discharge current flows between electrodes of the lamp 2 and the spark discharge current becomes damped oscillation current by the LC resonance. Thereby, the duration time of the spark discharge current can be prolonged significantly compared with that in the case where the diode 51 is not connected.

The lamp voltage during a time period where the spark discharge current flows in the lamp 2, is made lower than charge voltage of the capacitor 35 and the capacitor 37 and at this moment, the current flows to the lamp 2 via the H-bridge circuit 7a by which the lamp 2 starts turning on. Accordingly, by connecting the diode 51, the duration time of the spark discharge current is prolonged, current sufficient for starting to turn on the lamp 2 can be made to flow with certainty from the capacitor 35 and the capacitor 37 via the H-bridge 7a by which the lamp 2 can be turned on with certainly. That is, the turn on performance of the lamp 2 can be promoted.

Further, the capacitor 53 is charged at the intermediary potential point of the H-bridge circuit 7a and accordingly, the potential on the high voltage side of the capacitor becomes 0 V in switching on/off switch of the MOS transistors 41a–41d. Accordingly, the thyristor 57 can be turned off with certainty. That is, when the thyristor 57 is turned on once, it is not turned off unless a predetermined condition (for example, anode side potential of the thyristor 57>cathode side potential) is satisfied and in that case, the capacitor 53 cannot be charged again. Accordingly, when the lamp 2 is not turned on at the first period of on/off switch of the MOS transistors 41a–41d by any chance, thereafter, the lamp 2 cannot be turned on, however, the capacitor 53 is charged at the intermediary potential point of the H-bridge circuit 7a and accordingly, this can be prevented and the lamp 2 can be turned on with certainty.

Further, the capacitor 53 is charged at the intermediary potential point that is on the secondary side of the flyback transformer 29 and accordingly, the capacitor 53 is charged by a voltage produced by high voltage transformation by the direct current power source circuit 5. Although conventionally, a transformer for making both end voltage of the capacitor 53 to be a high voltage has been provided separately from the direct current power source circuit 5, the transformer is not needed to install for such a purpose. In this way, the flyback transformer 29 is used commonly for the starting circuit 8 and the direct current power source circuit 5 and accordingly, the number of transformers can be reduced to one and cost reduction can be achieved.

Although the gate drive signal is outputted from the high voltage generation control circuit 13 in synchronism with a timing of switching the MOS transistors 41a–41d, a signal informing the timing of switching the MOS transistors 41a–41d is inputted from the H-bridge control circuit 11 to the high voltage generation control circuit 13 and a timing of outputting the gate drive signal is set based on the signal.

Further, when the lamp 2 is turned on, the starting circuit 8 need not drive and therefore, a low level signal is outputted as the gate drive signal. Whether the lamp is turned on is determined by whether the lamp current IL is a predetermined value or higher. That is, when the lamp 2 is turned on, the lamp current IL flows in the resistor 32 for current detection via the H-bridge circuit 7a and accordingly, when the lamp current IL is detected, the gate drive signal is made it to the low level signal.

(Drive Circuit of IC Elements 43a, 43b)

Figure 4:
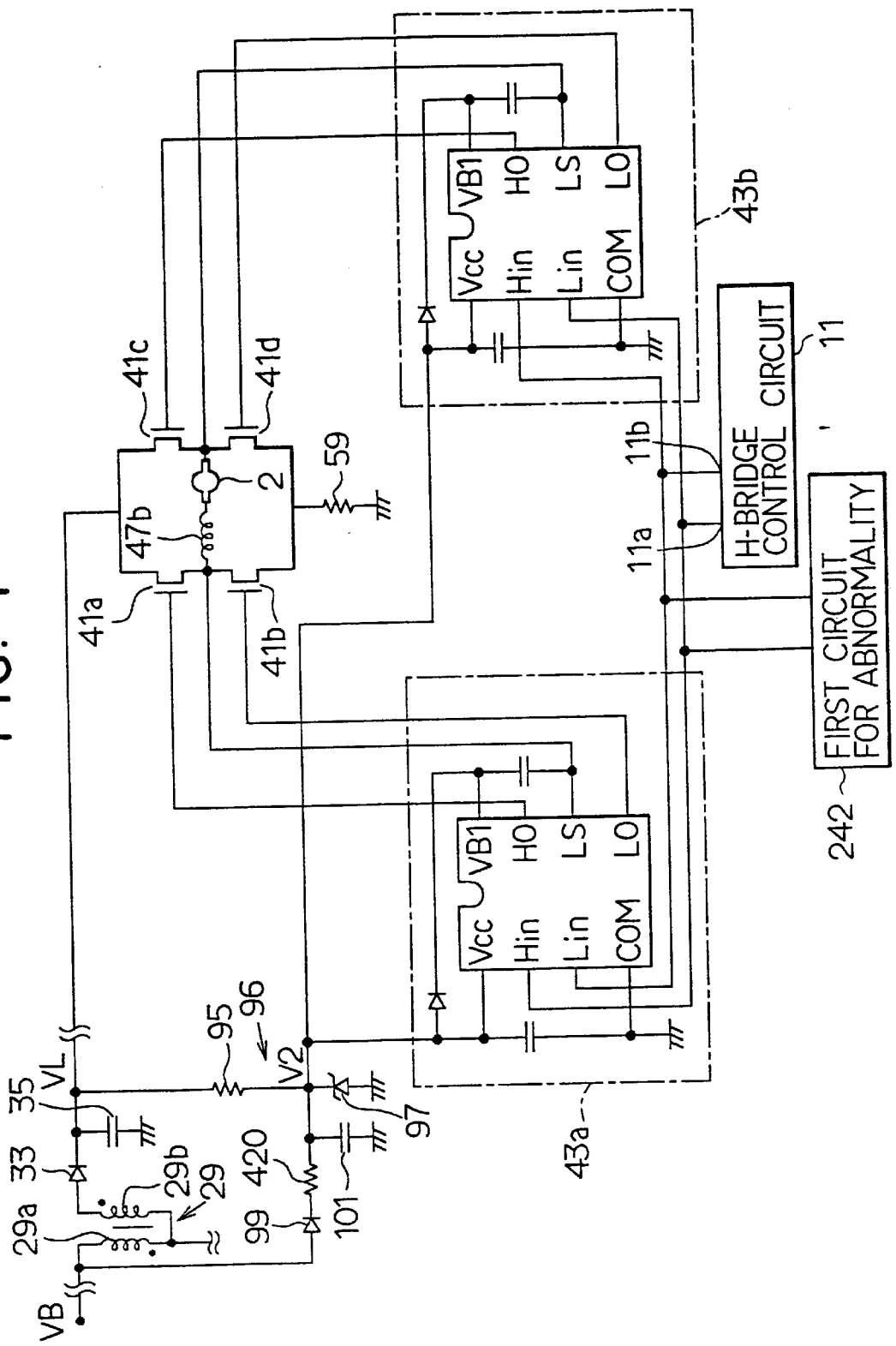
FIG. 4 is a circuit diagram of a bridge drive circuit according to the embodiment.

As shown in FIG. 4, a high and low drive circuit (International Rectifier Co. Ltd., IR 2101) is used in the IC element 43a. Further, the IC elements 43a and 43b have the same construction.

Respective power source terminals Vcc of the IC elements 43a and 43b are connected to the secondary side of the flyback transformer 29. That is, a first power source circuit 96 comprising a resistor 95 and a zener diode 97 is installed on the secondary side of the flyback transformer 29 and a voltage applied to the power source terminal Vcc becomes a predetermined voltage V2 (15 V) generated by the first power source circuit 96.

Further, a high voltage side input terminal Hin of the IC element 43a is connected to a low voltage side input terminal Lin of the IC element 43b. Further, a high level signal or a low level signal from a terminal 11a in the H-bridge control circuit 11 is inputted similarly to the two terminals Hin and Lin.

Further, a low voltage side input terminal Lin of the IC element 43a is connected to a high voltage side input terminal Hin of the IC element 43b. Further, a high level signal or a low level signal from a terminal 11b of the H-bridge control circuit 11 is inputted similarly to the two terminals Hin and Lin. Further, the high level signal and the low level signal are inverted to each other at the terminals 11a and 11b of the H-bridge control circuit 11.

When the high level signal is outputted from the terminal 11a of the H-bridge control circuit 11 and the low level signal is outputted from the terminal 11b, the MOS transistors 41a and 41d are turned on and the MOS transistors 41b and 41c are turned off. Further, when the low level signal is outputted from the terminal 11a of the H-bridge control circuit 11 and the high level signal is outputted from the terminal 11b, the MOS transistors 41b and 41c are turned on and the MOS transistors 41a and 41d are turned off.

In this way, according to the embodiment, the IC elements 43a and 43b are controlled by the H-bridge control circuit 11 by utilizing the secondary voltage (lamp voltage) generated by the secondary winding 29b. Thereby, even when the battery voltage VB is lowered, the drive voltage can be provided from the secondary side of the flyback transformer 29 by which the MOS transistors 41a–41d can be controlled to drive stably.

Meanwhile, the IC elements 43a and 43b can be controlled to drive by voltage (battery voltage VB) on the primary side via a diode 99 that is a one-directional semiconductor switching element other than the voltage on the secondary side of the transformer 29. The reason for such a constitution is derived from the following two reasons.

A feedback control is carried out by the lamp power control circuit 10 described above such that the lamp power of the lamp 2 becomes a desired value based on the lamp voltage VL (voltage signal) in correspondence with the discharge voltage of the lamp 2 and the lamp current IL (current signal) in correspondence with the discharge current of the lamp 2.

Further, for example, immediately after the on/off switch SW is turned on, no voltage is generated on the side of the secondary winding 29b. Therefore, the H-bridge circuit 7a cannot be controlled to drive immediately after the on/off switch SW is turned on and control delay or instability in the feedback control may be caused in the worst case.

Hence, the IC elements 43a and 43b can be driven by the battery voltage VB even immediately after the on/off switch SW is turned on such that the H-bridge circuit 7a can be controlled to drive.

In an abnormal state, mentioned later, where the lamp voltage VL is made lower than the predetermined voltage Vr1, the power source for driving the IC elements 43a and 43b becomes deficient and the H-bridge circuit 7a cannot be turned off (conduction of all the MOS transistors 41a–41d brings about an interrupted state, hereinafter, this is referred to as the H-bridge circuit 7a is turned off).

Hence, in the abnormal state, the IC elements 43a and 43b are provided with a drive power source by the battery voltage VB. In this way, the H-bridge circuit 7a can be turned off with certainty even under the abnormal state.

In case of the abnormal state, the H-bridge circuit 7a is turned off through the IC elements 43a and 43b by making both of two output signals of a first circuit for abnormality designated by numeral 242 in FIG. 4 the high level signals.

when the battery voltage VB is 12 V, the voltage applied to the respective power source terminals Vcc of the IC elements 43a and 43b is controlled to a constant voltage of 15 V by the zener diode 97. Accordingly, the diode 99 in FIG. 4 achieves function of preventing reversed flow. Also, numeral 101 designates a capacitor for removing noise and numeral 420 designates a resistor for restricting current.

(Drive Power Source of MOS Transistor 31)

Figure 5:
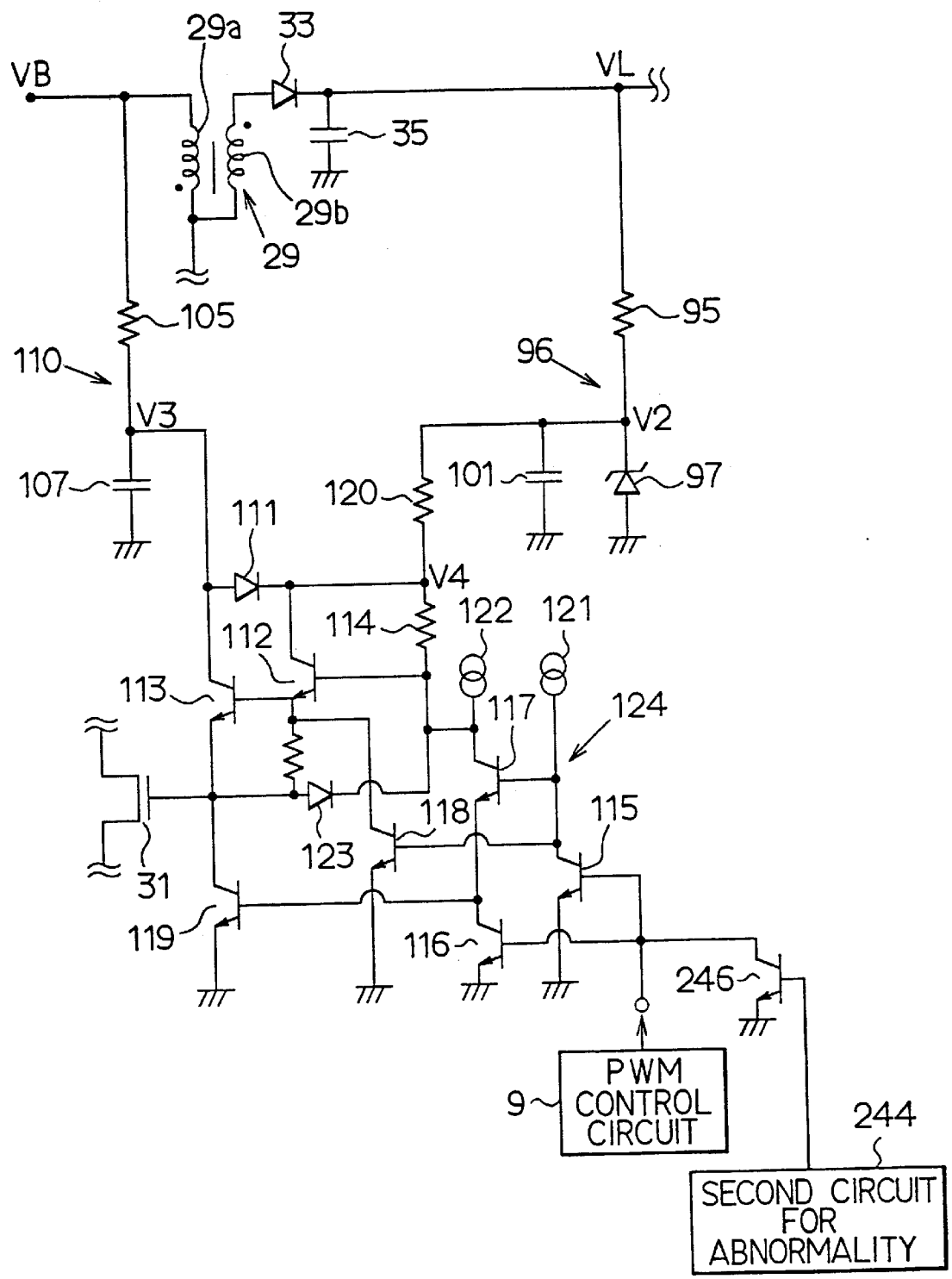
FIG. 5 is a circuit diagram of a drive circuit of an MOS transistor 31 according to the embodiment.

As shown in FIG. 5, the secondary side of the transformer 29 is provided with the first power source circuit 96 for causing the high voltage generated on the secondary side to be a predetermined constant voltage V2 (for example, 15 V) by the resistor 95 and the zener diode 97.

On the side of the battery 1 (primary side), there is installed a second power source circuit 110 for providing a predetermined voltage V3 (second predetermined voltage) determined by the battery voltage by a resistor 105 and a capacitor 107.

Between the first power source circuit 96 and the second power source circuit 110, there is installed a diode 111 as a switching element via a resistor 120 on the side of the first power source circuit 96.

Current flows in the diode 111 when the predetermined voltage V3 is higher by comparing the predetermined voltage V3 with a predetermined voltage V4 (first predetermined voltage) produced by reducing the voltage from the predetermined voltage V2 by the resistor 120. in this example, when the battery voltage VB is substantially at the rated voltage, the predetermined voltage V3 is made higher than the predetermined voltage V4 by the resistor 120 (normal state).

Between the first power source circuit 96 and the second power source circuit 110, two NPN transistors 112 and 113 connected in Darlington connection constituting a drive circuit 124 for driving the MOS transistor 31 are connected via a resistor 114. The diode 111 is installed between the two collectors of the NPN transistors 112 and 113.

Therefore, in the normal state the predetermined voltage V3 is higher than the predetermined voltage V4 and accordingly, current flows in the diode 111. Therefore, base current flows from the primary side of the transformer 29 to the NPN transistor 112 and the NPN transistor 112 is turned on. Then, collector current of the NPN transistor 112 constitutes base current of the NPN transistor 113 and collector current flows from the primary side of the transformer 29 to the NPN transistor 113.

When the predetermined voltage V4 is higher than the predetermined voltage V3, for example, when the battery voltage is lowered, base current flows from the secondary side to the NPN transistor 112 and the NPN transistor 112 is turned on. Then, the NPN transistor 113 is also turned on and collector current flows from the primary side of the transformer 29 to the NPN transistor 113.

At this moment, the predetermined voltage V4 is higher than the predetermined voltage V3 and therefore, no current flows in the diode 111. Accordingly, a relationship where the predetermined voltage V4 is higher than the predetermined voltage V3 is maintained.

As shown in FIG. 5, operation of the NPN transistors 112 and 113 are controlled by five NPN transistors 115–119 which are turned on and off by receiving an output signal from the PWM control circuit 9. The NPN transistors 115 and 116 are turned on or off in accordance with the output signal (duty signal) from the PWM control circuit 9. The high level signal of the output signal is referred to as an ON signal, while the low level signal thereof is referred to as an OFF signal.

For example, when the output signal is the ON signal, the NPN transistors 115 and 116 are turned on and constant current from a constant current source 121 constitutes collector current of the NPN transistor 115. Thereby, the NPN transistor 117 and 118 are turned off and the NPN transistor 119 is also turned off.

That is, when the duty signal is the ON signal, the NPN transistor 115 and 116 are turned on and the NPN transistors 117–119 are turned off. Therefore, collector current of the NPN transistor 112 flows to the base of the NPN transistor 113 and the NPN transistor 113 is turned on. As a result, collector current of the NPN transistor 113 flows to the gate of the MOS transistor 31 and the MOS transistor 31 is turned on.

When the output signal is the OFF signal, the NPN transistors 115 and 116 are turned off and accordingly, the NPN transistor 117 is turned on by the constant current source 121. Thereby, constant current flows from a constant current source 122 to the NPN transistor 117. Further, at this moment, the NPN transistor 118 is also turned on by the constant current source 121. Thereby, collector current of the NPN transistor 112 flows to the NPN transistor 118. As a result, the NPN transistor 113 is turned off.

Further, the NPN transistor 116 is turned off and accordingly, collector current which flows in the NPN transistor 117 flows to the base of the NPN transistor 119 and the NPN transistor 119 is turned on. Thereby, collector current of the NPN transistor 113 does not flow to the gate of the MOS transistor 31 but constitutes collector current of the NPN transistor 119 and the MOS transistor 31 is turned off. In this way, the MOS transistor 31 is turned on and off by the ON signal and the OFF signal.

Further, a diode 123 is installed between the gate of the MOS transistor 31 and the constant current source 122 as shown in FIG. 5.

The diode 123 accelerates the switching speed when the MOS transistor 31 is changed from ON state to OFF state. That is, when the MOS transistor 31 is changed from ON state to OFF state, electric charge stored at the gate of the MOS transistor 31 is drawn through the diode 123 and collector current of the NPN 117 transistor is increased. Thereby, base current of the NPN transistor 119 is increased and accordingly, the NPN transistor 131 is swiftly turned off. As a result, the switching speed of the MOS transistor 31 can be promoted.

In operation of the circuit shown in FIG. 5, it is assumed as a premise that the battery voltage VB is substantially the rated voltage, the second power source circuit 110 generates the predetermined voltage v3 and in this case, the on/off switch SW is turned on and the output signal from the PWM control circuit 9 is the ON signal.

In this case, immediately after the on/off switch SW is turned on, no voltage is generated on the secondary side of the transformer 29. Accordingly, in this case, the NPN transistor 112 is turned on by the predetermined voltage V3 of the second power source circuit 110 and the NPN transistor 113 is also turned on. That is, base current and collector current of the NPN transistors 112 and 113 are provided by the second power source circuit 110. As a result, the MOS transistor 31 is turned on by obtaining drive power source from the primary side of the flyback transformer 29, that is, the second power source circuit 110.

Thereafter, when the PWM control circuit 9 repeats to output the ON and OFF signals, the secondary winding 29b receives energy of the primary winding 29a by which the voltage on the secondary side gradually rises. Thereby, the predetermined voltage V2 is generated by the first power source circuit 96 and further, the predetermined voltage V4 is generated.

Next, it is assumed as a premise that the battery voltage is lowered during a time period where the lamp is turned on and accordingly, the predetermined voltage V3 is lowered and the predetermined V3 is made lower than the predetermined voltage V4.

Then, the diode 111 switches path of current such that base currents of the NPN transistors 112 and 113 are provided from the secondary side of the transformer 29 (first power source circuit 96). That is, the NPN transistor 112 receives drive power source from the secondary side of the transformer 29 (first power source circuit 96).

As a result, according to the embodiment, when the power source voltage VB of the battery 1 is lowered during a time period where the lamp is turned on, the NPN transistors 112 and 113 and the MOS transistor 31 can stably be controlled to drive by the first power source circuit 96 on the secondary side of the transformer 29.

Therefore, according to the embodiment, the drive power source of the NPN transistor 112 is provided from the first power source circuit 96 only when the predetermined voltage V3 is made lower than the predetermined voltage V4.

As described above, according to the embodiment, high voltage as high as 400 V is generated on the secondary side of the transformer 29. Accordingly, in order to make the zener diode 97 small-sized and inexpensive, a resistor having a very large resistance value needs to be used for the resistor 95. However, thereby, there occurs a problem where large power is consumed by the resistor 95 having a large resistance value.

Hence, current flows in the resistor 95 only when the predetermined voltage V3 is made lower than the predetermined voltage V4 by which power consumption at the resistor 95 can be reduced.

Further, while high voltage as high as 400 V is generated on the secondary side of the transformer 29, the larger the resistance value, the smaller the power consumption at the resistor 95. Also, there is established a relationship of R(95)=(VL−V2)/Is of the maximum value of the resistance value of the resistor 95. Notation VL designates the secondary voltage of the transformer 29 (minimum value necessary for operating normally the NPN transistor 112) and notation Is designates current supplied to a load by the first power source circuit 96.

In such a relationship, V2 and Is are fixed values determined by the circuit. Accordingly, the resistance value of the resistor 95 is determined by how much volts are chosen for the minimum value of VL mentioned above. Accordingly, in this example, the drive power source of the NPN transistor 112 is provided from the first power source circuit 96 only when the predetermined voltage V3 is made lower than the predetermined voltage V4. Thereby, the resistance value of the resistor 95 can be increased and accordingly, the power consumption at the resistor 95 can be reduced.

Further, according to the embodiment, the following effect is achieved by connecting the NPN transistor 112 to the NPN transistor 113 by Darlington connection. Here, a voltage drop at the resistor 114 is disregarded.

When the battery voltage VB is substantially the rated voltage, respective base current and collector current of the NPN transistors 112 and 113 flow from the primary side of the transformer 29 (second power source circuit 110). Accordingly, potential difference between the collector and the emitter of the NPN transistor 113 is a sum of the voltage drop and a sum of the potential drop between the collector and the emitter and voltage drop of the diode 111 in the forward direction.

That is, in this case, voltage applied to the gate of the MOS transistor 31 becomes V3−(VBE112+VBE113)=V3−1.4(V). Notation VBE 112 designates voltage drop in the forward direction between the emitter and the base of the transistor 112 and notation VBE 113 designates voltage drop in the forward direction between the emitter and the base of the transistor 113.

Further, for example, when the battery voltage VB is gradually lowered from the rated voltage and the predetermined voltage V3 is made lower than the predetermined voltage V4. In this case, the NPN transistor 113 is turned on by the first power source circuit 96 and a potential difference between the predetermined voltage V4 and voltage at the emitter of the NPN transistor 113 is a sum of respective voltage drop between the bases and the emitters of the NPN transistors 112 and 113.

However, in this case, the first power source circuit 96 and the second power source circuit 110 are regarded to be separated from each other by the diode 111 and accordingly, the potential difference between the emitter and the collector of the NPN transistor 113 in this case is only the voltage drop between the emitter and the collector.

That is, the voltage applied to the gate of the MOS transistor 31 is V3−VCE113=V3(V). Notation VCE designates voltage drop=0 (V) between the collector and the emitter of the transistor 113.

Accordingly, the MOS transistor 31 can be turned on until the battery voltage VB is lowered to the gate voltage necessary for performing the switching operation of the MOS transistor 31.

Further, in FIG. 5, an NPN transistor 246 stops control of the PWM control circuit 9 when abnormal state is caused, that is, in order to turn off the MOS transistor 31, both of the NPN transistors 115 and 116 are forcibly turned off by the second circuit for abnormality 244.

(Lamp Power Control Circuit 10)

Figure 6:
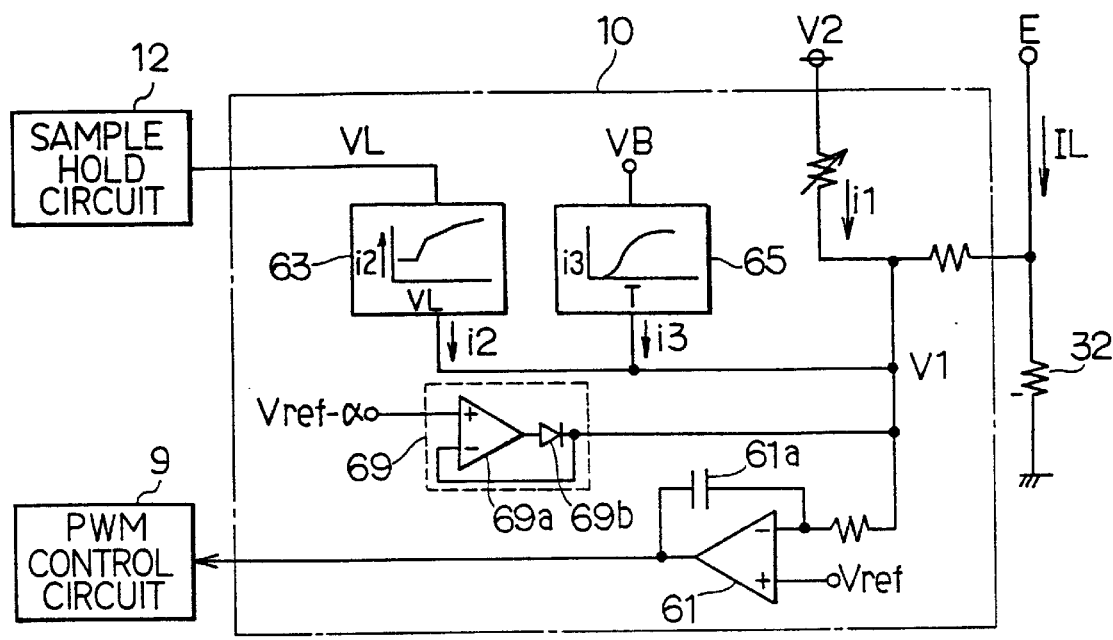
FIG. 6 is a circuit diagram of a lamp power control circuit according to the embodiment.

The lamp power control circuit 10 shown in FIG. 6 is installed with an error amplifying circuit (integrated circuit) 61 for generating an output in accordance with the lamp voltage VL, the lamp current IL or the like which is a signal indicating a discharge turn-on state of the lamp 2 and the output from the error amplifying circuit 61 is inputted to the PWM control circuit 9. The lamp control circuit 10 controls the lamp power by inverting the output voltage (output signal) from the error amplifying circuit 61 finally at inside of the PWM control circuit 9.

That is, according to the control by the PWM control circuit 9, the higher the output potential of the error amplifying circuit 61, the smaller a threshold level for a sawtooth wave becomes and the larger the on/off switch duty ratio of the MOS transistor 31 becomes. Thereby, the lamp power is increased.

According to the control of the PWM control circuit 9, the lower the output potential of the error amplifying circuit 61, the larger the threshold level for the sawtooth wave becomes and the smaller the on/off switch duty ratio of the MOS transistor 31 becomes. Thereby, the lamp power is reduced.

As shown in FIG. 6, a reference voltage Vref is inputted to a noninverting input terminal of the error amplifying circuit 61 and voltage V1 constituting a parameter for controlling the lamp power PL is inputted to an inverting input terminal. Thereby, in the error amplifying circuit 61, an output in accordance with the voltage V1 is generated and the on/off switch duty ratio is set based on the output.

Further, the circuit operates such that when the voltage V1 is higher than the reference voltage Vref, the output voltage of the error amplifying circuit 61 is reduced and when the voltage V1 is lower than the reference voltage Vref, the output voltage of the error amplifying circuit 61 is increased.

The voltage V1 is determined based on a composite signal of the lamp current IL, the lamp voltage VL and the like, that is, the lamp current IL, current i1 which flows by the constant voltage v2, current i2 set by a first current setting circuit 63 and current i3 set by a second current setting circuit 65.

The circuit operates such that when the voltage V1 is higher than the reference voltage Vref, the output voltage of the error amplifying circuit 61 is reduced and when the voltage V1 is lower than the reference voltage Vref, the output voltage of the error amplifying circuit 61 is increased.

Further, the lamp voltage VL is a value of an output from the sample hold circuit 12. Further, a sum of the current i1, the current i2 and the current i3 is set to be sufficiently smaller than the lamp current IL.

Here, the first current setting circuit 63 sets the current i2 such that the higher the lamp voltage VL the larger the current i2 as shown in the figure. Further, the current i2 is set in a relationship where different straight lines are connected such that the higher the lamp voltage VL, the more gradual inclinations thereof as shown in the diagram.

The second current setting circuit 65 sets the current i3 such that the longer a time period T, the larger the current i3 as shown in the drawing. The time period T corresponds to a time period which has elapsed since the lamp 2 has been turned off, predicting indirectly a state of the electrode temperature.

That is, when the lamp 2 is turned on continuously for a certain degree of time period, the electrode temperature rises sufficiently and thereafter, when the lamp 2 is turned off for a short period of time and the lamp 2 is turned on again, the amount of temperature drop of the electrode temperature is small. Accordingly, in this case, the lamp power may be smaller than that in a state where the electrode is cooled down to, for example, around outside air temperature. As a result, according to the embodiment, the electrode temperature can be predicted indirectly and the lamp power can be controlled in accordance with the electrode temperature.

In this way, the lamp power control circuit 10 carries out the control based on the lamp current IL and the lamp voltage VL and accordingly, it is important to accurately detect the lamp current IL and the lamp voltage VL. According to the embodiment, a clamp circuit 69 and the sample hold circuit 12 are installed in order to accurately detect the lamp voltage VL and the lamp current IL. An explanation will be given of the clamp circuit 69 and the sample hole circuit 12 as follows.

The clamp circuit 69 clamps the voltage V1 inputted to the inverting input terminal of the error amplifying circuit 61.

As shown in the figure, the clamp circuit 69 constitutes a voltage follower circuit. A noninverting input terminal of an operational amplifier 69*a* installed to the clamp circuit 69, is inputted with a voltage of vref-α which is inputted to the noninverting input terminal of the error amplifying circuit 61 and which is lower than the predetermined voltage Vref by a predetermined voltage. A diode 69*b* is connected to an output terminal of the clamp circuit 69 such that the operational amplifier 69*a* cannot draw current from the side of the output terminal.

Under such a constitution, when the voltage V1 is higher than the predetermined voltage Vref-α, the voltage at the inverting input terminal is higher than that of the noninverting input terminal of the operational amplifier 69*a* and accordingly, the operational amplifier 69*a* draws current from the side of the output terminal. However, the diode 69*b* is provided on the side of the output terminal and accordingly, the operational amplifier 69*a* cannot draw current and the voltage V1 is inputted to the error amplifying circuit 61 without receiving influence of the clamp circuit 69.

Further, when the voltage V1 is lower than the predetermined voltage Vref-α, the voltage at the noninverting input terminal of the operational amplifier 69*a* is higher than that of the inverting input terminal and accordingly, the operational amplifier 69*a* pushes out current to the side of the output terminal. Thereby, the voltage V1 is maintained such that it is not equal to or lower than the predetermined voltage Vref-α.

Figure 7:
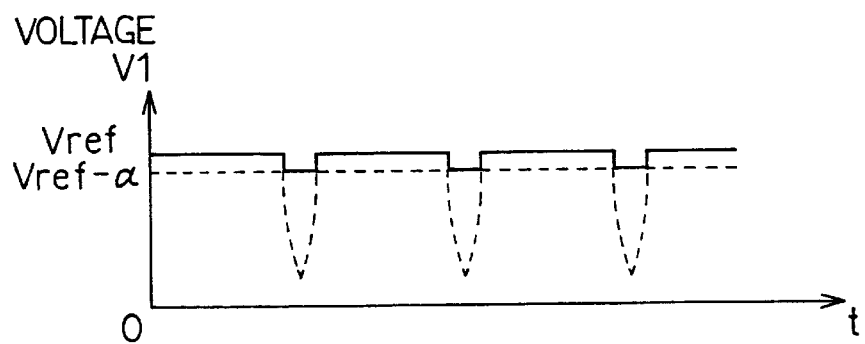
FIG. 7 is a time chart showing a waveform of voltage V1 in FIG. 6.

A change in the voltage V1 when the clamp circuit 69 is installed is shown in FIG. 7. As shown in FIG. 7, the lamp current IL is instantaneously lowered significantly and the voltage V1 is instantaneously changed in switching on/off switch of the MOS transistors 41*a*–41*d* in the H-bridge circuit 7*a*. However, the voltage V1 is prevented from being equal to or lower than the predetermined voltage Vref-α and is maintained at a voltage higher than the predetermined voltage Vref-α. Accordingly, no abrupt change is caused in the voltage V1.

In this way, a change in the voltage V1 in switching the MOS transistors 41*a*–41*d* (in switching discharge current of lamp 2) can be reduced and accordingly, in controlling the power supply from the battery 1 by a feedback control, influence caused by instantaneous change of the lamp current IL can be restrained.

Further, the larger the inductance of the transformer 47*b*, the larger a time period where the lamp current IL is lowered. Further, according to the embodiment, a transformer necessary for the starting circuit 8 and a transformer for the direct current power source circuit 5 are commonly used by using the flyback transformer 29 and accordingly, the inductance of the transformer 47*b* is large and the influence by the lamp current IL is significant. However, in this way, the clamp circuit 69 is installed and therefore, even in such a case the influence by lamp current IL on the feedback control can effectively be restrained.

Further, when the frequency of switching the MOS transistors 41*a*–41*d* is high, the influence by the change in the lamp current IL on the feedback control is significant by a delay in the feedback control, however, the influence can be restrained even when the switching frequency is high and accordingly, the circuit is effective.

Further, the error amplifying circuit 61 is installed with a capacitor 61*a* for integrating operation and the influence of the lamp current IL can also be alleviated by increasing the capacitance of the capacitor 61*a*, however, when the capacitance of the capacitor 61*a* is increased, the response performance of the error amplifying circuit 61 cannot be ensured and therefore, it is effective to install the clamp circuit 69.

Figure 8:
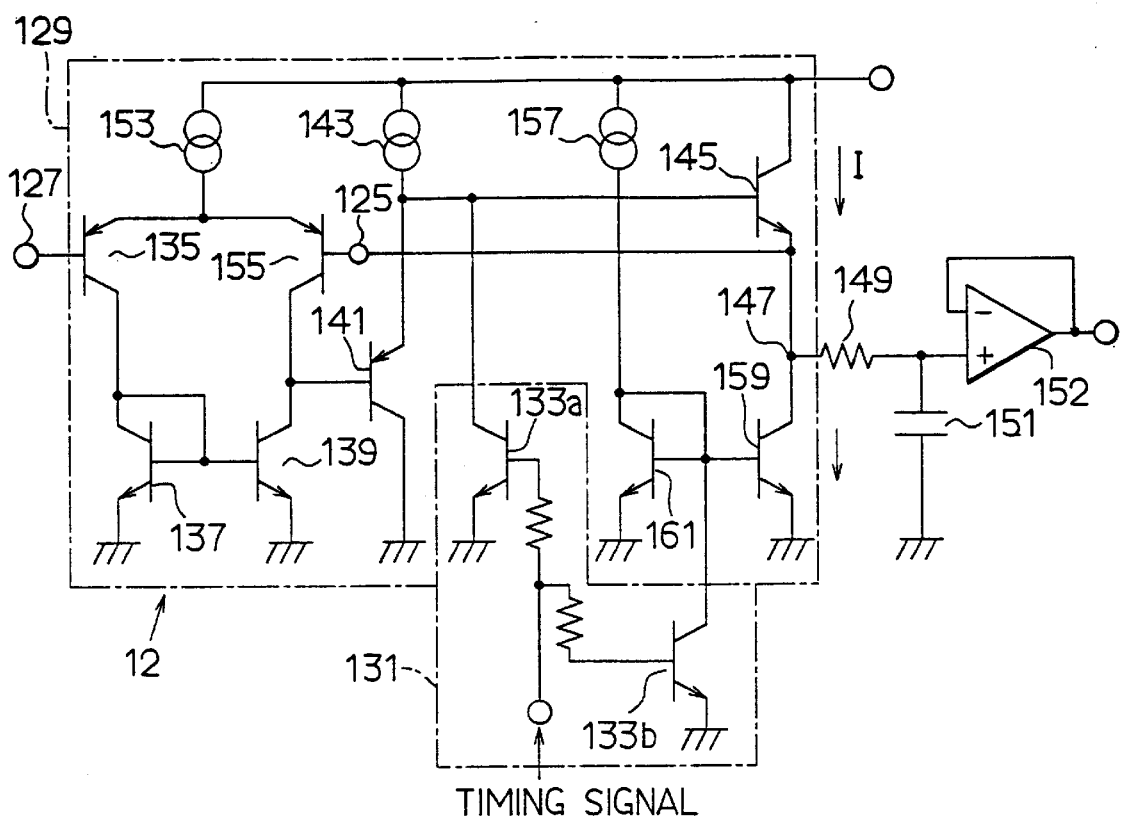
FIG. 8 is a circuit diagram of a sample hold circuit according to the embodiment.
Figure 9:
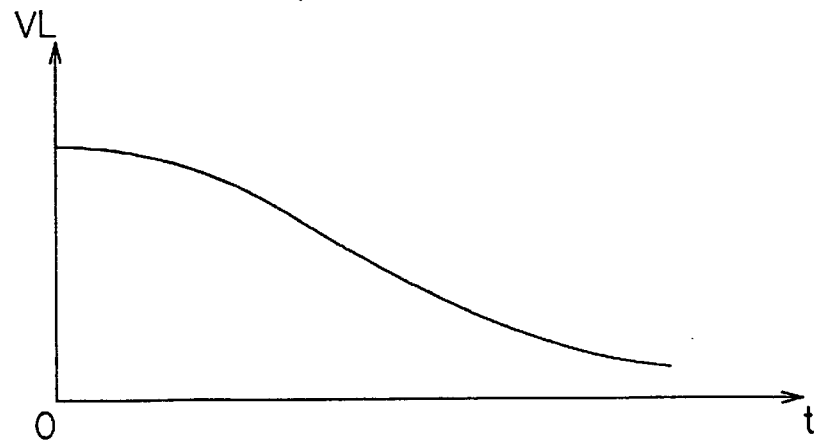
FIG. 9 is a time chart showing a waveform of lamp voltage VL in FIG. 8.

In FIG. 8, the sample hold circuit 12 excludes transient voltage caused by the secondary winding 47*b* and the capacitor 35. The sample hold circuit 12 is installed with a buffer amplifier circuit 129 connected with an inverting input terminal 125 and an output terminal 147, and a mask circuit 131 for maintaining an output from the buffer amplifier circuit 129 for a predetermined time period and the transient voltage is excluded from the lamp voltage VL including the transient voltage by these circuits. The sample hold circuit 12 is installed with an operational amplifier 152 and an output of the sample hold circuit 12 is generated and a control signal in accordance with the lamp voltage VL is finally transmitted to the lamp power control circuit 10 by the operational amplifier 152.

The sample hold circuit 12 turns on and off NPN transistors 133*a* and 133*b* in the mask circuit 131 based on a timing signal from a digital circuit (not illustrated). Further, when the timing signal (input signal) to the mask circuit 131 is a low level signal, the sample hold circuit 12 samples the lamp voltage VL at that time and generates an output in accordance with the lamp voltage VL and when the timing signal is switched to a high level signal, the circuit holds an output in accordance with the lamp voltage VL sampled immediately therebefore. The circuit operates as follows in the case where the timing signal is the low level signal and in the case where it is switched to the high level signal.

(1) When the Timing Signal is the Low Level Signal

In this case, the NPN transistors 133*a* and 133*b* are turned off and accordingly, an output in accordance with the lamp voltage VL is generated.

When the lamp voltage VL inputted to a noninverting input terminal 127 is increased, voltage difference between voltage at the inverting input terminal 125 and voltage at the noninverting input terminal 117 is increased, voltage at the base terminal of a transistor 141 constituting an output from a differential circuit comprising transistors 135, 155, 137 and 139 rises, current is amplified by transistors 141 and 145 constituting an emitter follower circuit and voltage at the output terminal of the buffer amplifier circuit 129 rises. By this operation, the voltage at the noninverting input terminal 127 and the voltage at the inverting input terminal 125 (voltage at output terminal 147 of buffer amplifier circuit 129) are operated to become equal.

That is, the buffer amplifier circuit 129 operates as a differential amplifier circuit such that the voltage at the output terminal 147 becomes a voltage the same as the lamp voltage VL.

Therefore, current flowing to a capacitor 151 via a ripple smoothing resistor 149 increases and charge voltage of the capacitor 151 is increased. Further, the operational amplifier 152 outputs an output accompanied by an increase in the charge voltage.

Further, by a reduction in a value of current flowing to the NPN transistor 135, current flowing from a constant current source 143 to the NPN transistor 155 is increased and bias current flowing to the inverting input terminal 125 is increased, however, the current is extremely small and therefore, effects no influence in charging the capacitor 151.

Further, when the lamp voltage VL inputted to the non-inverting input terminal 127 is reduced, a different operation reverse to the above operation is carried out and the voltage at the output terminal 147 is made to be a voltage similar to the lamp voltage VL.

That is, when the timing signal is the low level signal, the voltage in accordance with the lamp voltage VL at that moment is stored to the capacitor 151 and the sample hold circuit 12 samples the lamp voltage VL at that moment.

(2) When the Timing Signal is the High Level Signal

In this case, the NPN transistors 133a and 113b are turned on. Therefore, current from the constant current source 143 flows to the transistor 133a and current from a constant current source 157 flows to the transistor 133b and the NPN transistors 145, 159 and 161 are turned off. Therefore, at this moment, no current flows in the capacitor 151 and the capacitor 151 holds charge voltage immediately before the timing signal is switched to the high level signal. That is, when the timing signal is switched to high level, the buffer amplifier 129 does not operate as a differential amplifier circuit.

In this way, the buffer amplifier circuit 129 operates as a differential amplifier circuit except in generating transient voltage and in generating transient voltage, the transient voltage portion is masked such that the buffer amplifier circuit 129 does not operate as a differential amplifier circuit.

In this way, in generating transient voltage, the lamp voltage VL can be prevented from being sampled and the lamp voltage VL at a normal time except in generating transient voltage can be detected. Although conventionally, a lamp voltage VL is flattened by using a choke coil whereby the lamp voltage VL at normal time can be detected, by installing the sample hold circuit 12, the lamp voltage VL at normal time can be detected without using a choke coil.

The timing signal generated by a digital circuit is made to synchronize with timings of switching the MOS transistors 41a–41d in the H-bridge circuit 7a and is constituted specifically to output the high level signal during a time period of several tens µs—several hundreds µs after switching the MOS transistors 41a–41d.

(PWM Control Circuit 9)

Figure 10:
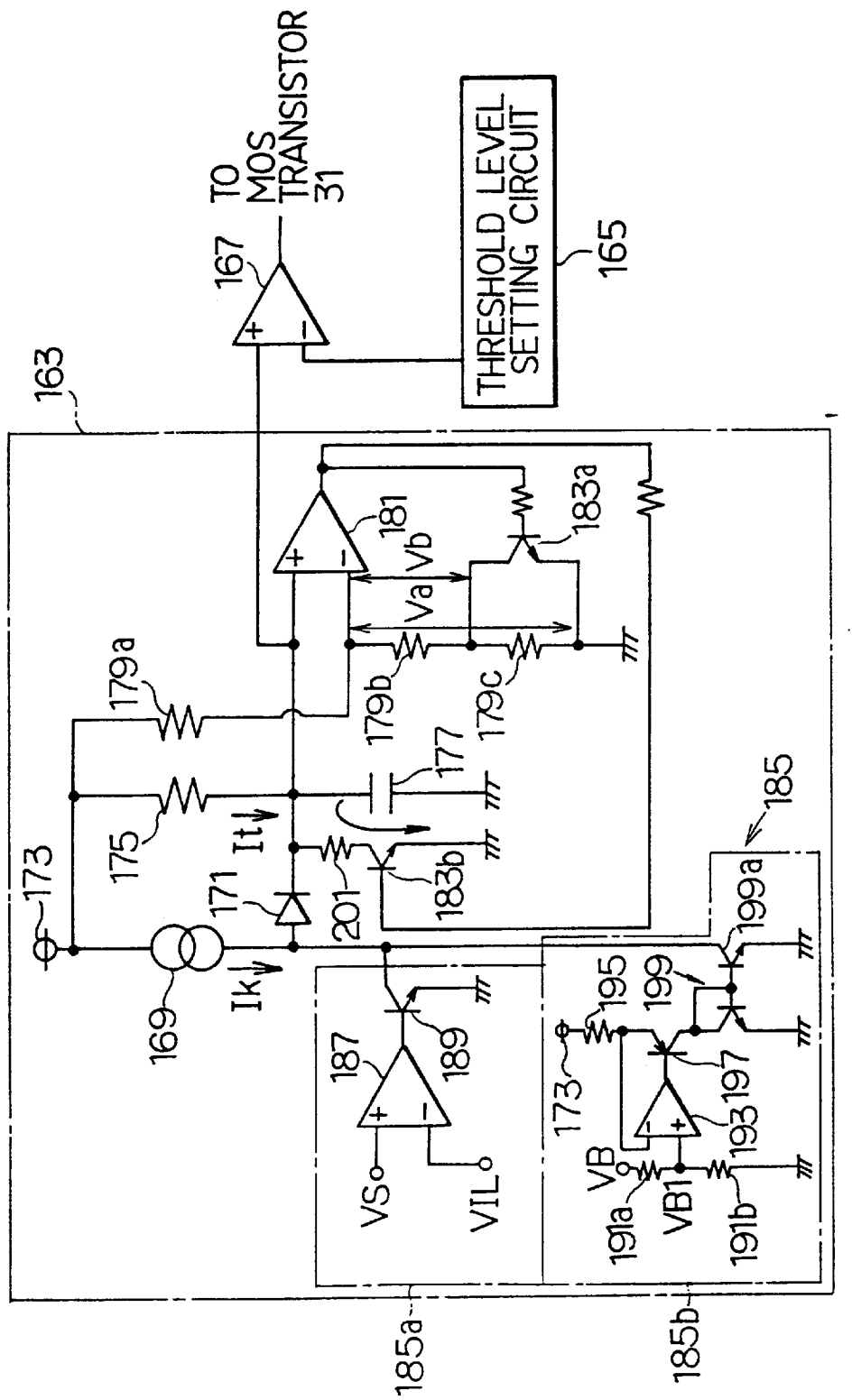
FIG. 10 is a circuit diagram of a sawtooth wave forming circuit in a PWM control circuit according to the embodiment.

As shown in FIG. 10, the PWM control circuit 9 is provided with a sawtooth wave forming circuit 163 for forming sawtooth waves, a threshold level setting circuit 165 for setting a threshold level (duty ratio) in the sawtooth wave and a comparator 167 for setting a duty ratio of on/off switching of the MOS transistor 31 by comparing the threshold level of the threshold level setting circuit 165 and the sawtooth wave.

The sawtooth wave forming circuit 163 forms sawtooth waves by making variable charge voltage of a capacitor 177 charged by current Ik flowing from a constant current source 169 via a diode 171 and current It flowing via a resistor 175 based on voltage at a current voltage source 173. That is, NPN transistors 183a and 183b are turned on or off based on the output from a comparator 181 by which threshold voltage set by resistors 179a–179c is made variable whereby sawtooth waves are formed.

Figure 11:
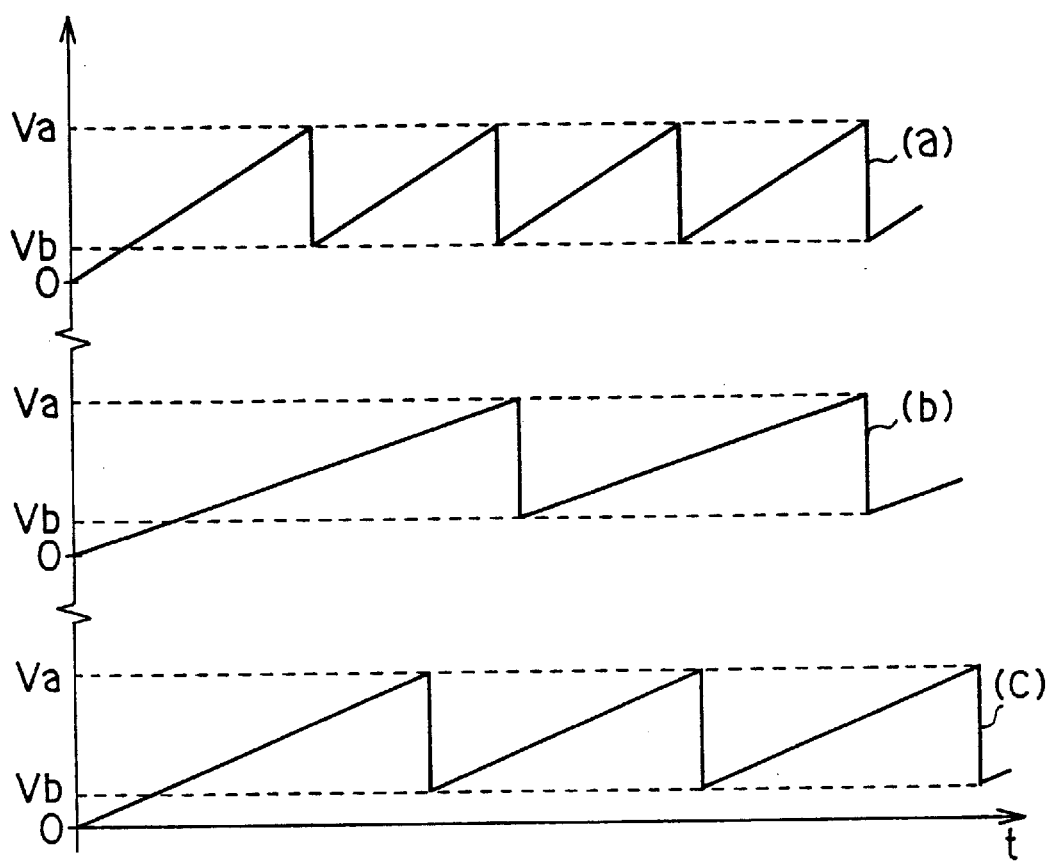
FIG. 11 is a time chart showing sawtooth waves formed by the sawtooth wave forming circuit in FIG. 10.

As shown by (a) in FIG. 11, the capacitor 177 is charged by the current Ik flowing from the constant current source 169 via the diode 171 and the current It flowing via the resistor 175 based on voltage at the constant voltage source 173.

Further, the capacitor 177 continues charging until charge voltage of the capacitor 177 reaches a first threshold voltage Va which is a voltage across the resistors 179b and 179c and the charge voltage of the capacitor 177 increases with a predetermined inclination during a time period until the charging operation is finished.

Thereafter, when the charge voltage of the capacitor 177 reaches the voltage Va, the comparator 181 outputs a high level signal whereby the NPN transistors 183a and 183b are turned on. Thereby, the first threshold voltage Va is reduced to a second threshold voltage Vb which is voltage across the resistor 179b and the capacitor 177 is discharged via a resistor 201. By discharging the capacitor 177, the charge voltage of the capacitor 177 is rapidly lowered.

Further, when the charge voltage of the capacitor 177 is lowered down to the second threshold voltage Vb, the comparator 181 outputs a low level signal whereby the NPN transistors 183a and 183b are turned off. Thereby, the second threshold voltage Vb returns to the first threshold voltage Va. Further, charge and discharge to and from the capacitor 177 is similarly repeated thereafter whereby sawtooth wave having a comparatively short period, that is, a comparatively high frequency is formed.

The sawtooth wave forming circuit operating in this way, is provided with a frequency change circuit 185 and the frequency of the sawtooth wave is changed by the frequency change circuit 185. The frequency change circuit 185 comprises a circuit 185a for changing the switching frequency before and after turning on the lamp 2 and a circuit 185b for changing the switching frequency in accordance with the battery voltage VB.

The circuit 185a and the circuit 185b respectively effect influence mainly on the operation of the sawtooth wave forming circuit 163 before and after turning on the lamp.

First, the circuit 185a is installed with a comparator 187 for comparing voltage VIL produced by converting the lamp current IL into voltage (high voltage side of current detecting resistor 59) with a predetermined voltage Vs and an NPN transistor 189 where on/off switch control is carried out by an output signal from the comparator 187. By installing the circuit 185a constituted as described above, the frequency of the sawtooth wave formed by the sawtooth wave forming circuit 163 is changed as follows.

17

(1) Before Turning on the Lamp 2

As shown by (b) in FIG. 11, before turning on the lamp 2, the voltage VIL is null and accordingly, the comparator 187 outputs the high level signal and the NPN transistor 189 is turned on.

Thereby, the current Ik from the constant current source 169 does not flow to the capacitor 177 and the capacitor 177 is charged only by the current It flowing via the resistor 175 based on the voltage at the constant voltage source 173. Therefore, a time period for charging the capacitor 177 is prolonged and the period of the sawtooth wave is prolonged.

Thereafter, the charge and discharge to and from the capacitor 177 are repeated similar to the basic operation and sawtooth waves having a comparatively long period where the frequency is lowered compared with the sawtooth wave formed by the basic operation of the sawtooth wave forming circuit 163.

(2) After Turning on the Lamp 2

After turning on the lamp 2, the voltage VIL becomes a predetermined voltage and accordingly, the comparator 187 outputs the low level signal and the NPN transistor 189 is turned off. Accordingly, the sawtooth wave forming circuit 163 forms the sawtooth wave without being influenced by the circuit 185a.

The circuit 185b is provided with resistors 191a and 191b for dividing the battery voltage VB. Further, voltage VB1 divided by these is inputted to an operational amplifier 193. Thereby, a transistor 197 is turned off when the voltage VB1 is equal to or larger than constant voltage at the constant voltage source 173 and when it is less than the constant voltage, the transistor 197 flows current in accordance with the battery voltage VB. Further, when the battery voltage VB is lowered, current in proportion to current flowing in the transistor 197 flows to a transistor 199a via a current mirror circuit 199.

By providing the circuit 185a, frequency of the sawtooth wave formed by the sawtooth wave forming circuit 163 is changed as follows.

(1) When the Battery Voltage VB is Sufficient

In this case, the transistor 197 is turned off as described above. Accordingly, the capacitor 177 is charged by the current Ik flowing from the constant current source 169 via the diode 171 and the current It flowing via the resistor 175 based on the voltage at the constant voltage source 173. Therefore, the sawtooth wave forming circuit 163 forms sawtooth waves similar to those in FIG. 11(a) by carrying out the basic operation.

(2) When the Battery Voltage VB is Low

The transistor 197 flows current in proportion to the battery voltage VB. Therefore, current in accordance with the battery voltage VB flows to the transistor 199a via the current mirror circuit 199. As a result, the current in accordance with the battery voltage VB is drawn from the constant current of the constant current source 169.

Accordingly, the current Ik from the constant current source 169 is reduced and drawn to the capacitor 177. Accordingly, the capacitor 177 is charged by the current Ik which has been reduced by an amount for lowering the battery voltage VB and the current It flowing via the resistor 175 based on the voltage at the constant voltage source 173.

Thereby, compared with the case where the battery voltage VB is sufficient, the time period for charging the capacitor 177 is prolonged and the period of the sawtooth wave is prolonged as shown by (c) in FIG. 11.

Thereafter, the sawtooth wave forming circuit 163 repeats charging and discharging the capacitor 177 as in the cases and forms the sawtooth waves each having a comparatively

18 long period in which the frequency is lowered more than that in the case where the battery voltage VB is sufficient and the case where the lamp 2 is turned on.

Thus, before turning on the lamp 2, as described above, the frequency of the sawtooth wave is changed to be comparatively low uniformly by the circuit 185a and after turning on the lamp 2, the frequency of the sawtooth wave is changed in accordance with the battery voltage VB by the circuit 185b.

The threshold level setting circuit 165 sets a threshold level in accordance with an instruction signal from the lamp power control circuit 10 (error amplifying circuit 61) and sets a threshold level for carrying out constant voltage control (for example, control at 400 V) such that the lamp voltage VL is prevented from being a predetermined voltage or higher. Further, the threshold level setting circuit 165 is provided with an inverting circuit for inverting the instruction signal from the lamp power control circuit 10 (error amplifying circuit 61). The level of the instruction signal by the lamp power control circuit 10 is changed in accordance with the lamp power PL intended to be supplied, the more the lamp power PL to be supplied, the more the power needs to be supplied by lowering the duty ratio and accordingly, the level of the instruction signal and the threshold level are inverted by providing the inverting circuit in the threshold level setting circuit 165.

The threshold level setting circuit 165 is provided with a circuit for setting a duty limit value constituting an upper limit value of the duty ratio.

The comparator 167 sets the duty ratio of on/off switching of the MOS transistor 31 by comparing the sawtooth wave with the threshold level.

Further, the switching frequency of the MOS transistor 31 in this case is the same as the frequency of the sawtooth wave formed by the sawtooth wave forming circuit 163 and accordingly, it is a comparatively low frequency regardless of whether the battery voltage VB is high or low before turning on the lamp 2, it is a comparatively high frequency when the lamp 2 is turned on and when the battery voltage VB is sufficient and it is a comparatively low frequency in accordance with an amount of lowering the battery voltage VB when the lamp 2 is turned on and when the battery voltage VB is lowered.

Figure 12:
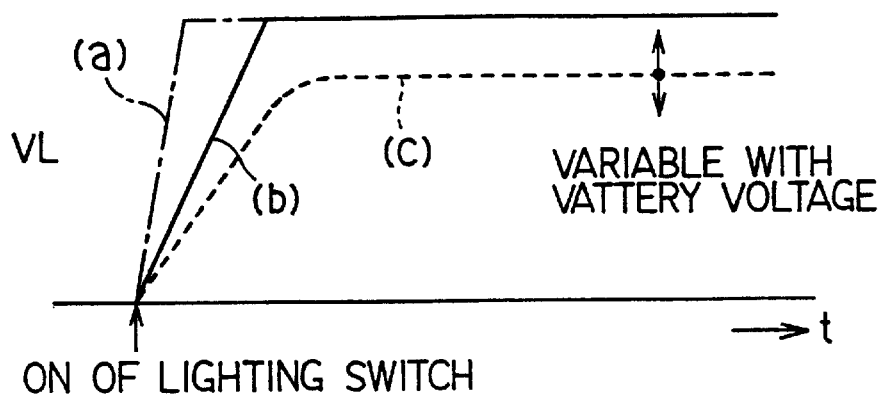
FIG. 12 is a time chart showing waveforms of primary current emerged in accordance with the sawtooth wave in FIG. 11.

In FIG. 12 showing waveforms of the lamp voltage VL before turning on the lamp 2, one-dotted chain line characteristics (a) shows the case where the battery voltage VB is sufficient, bold line characteristics (b) shows the case where the battery voltage VB is lowered and broken line characteristics (c) shows the case where the switching frequency is not lowered.

As shown by (a) and (b) in FIG. 12, when the switching frequency of the MOS transistor 31 is comparatively lowered, the lamp voltage VL reaches a predetermined value necessary for turning on the lamp and is controlled to the predetermined value (for example, 400 V mentioned above) by constant voltage control. Further, when the switching frequency is not changed, as shown by (c) in FIG. 12, the lamp voltage VL is changed by the battery voltage VB and the more lowered the battery voltage VB, the more lowered the lamp voltage VL. That is, by lowering the switching frequency the interruption current value of the primary current flowing in the primary winding 29a of the transformer 29 can be increased and the output power of the current power source circuit 5 can be increased more than that in the case where the switching frequency is not changed.

Further, total energy W (output power of direct current power source circuit 5) stored in the primary winding 29a per unit time is represented by Equation 1.

$$W = f \cdot (1/2LI^2)$$

where f: switching frequency,
L: inductance of primary winding 29a and
I: primary current.

As represented by Equation 1, the total energy W stored in the primary winding 29a per unit time is increased in proportion to the switching frequency and square of current. Therefore, by prolonging On/off switch period (=1/switching frequency) of the MOS transistor 31, the primary current is increased even if the switching frequency is lowered and accordingly, the total energy W stored in the primary winding 29a per unit time is increased.

According to the embodiment, the switching frequency of the MOS transistor 31 is comparatively lowered and therefore, the total energy W stored in the primary winding per unit time is increased as described above. That is, the output power of the direct current power source circuit 5 is increased and the lamp voltage VL having a predetermined voltage value necessary for turning on the lamp can be supplied even in the case where the battery voltage VB is lowered.

In this way, when the lamp 2 is not turned on, the switching frequency of the MOS transistor 31 is uniformly lowered more than that in the case where the lamp 2 is turned on by the circuit 185a by which power necessary for turning on the lamp 2 can be supplied and therefore, the turn on performance of the lamp 2 can be improved.

Further, after turning on the lamp 2, the lamp 2 is kept being turned on by a predetermined switching frequency whereby ripples the lamp current can be lowered by which sound resonance phenomenon can be restrained.

Figure 13:
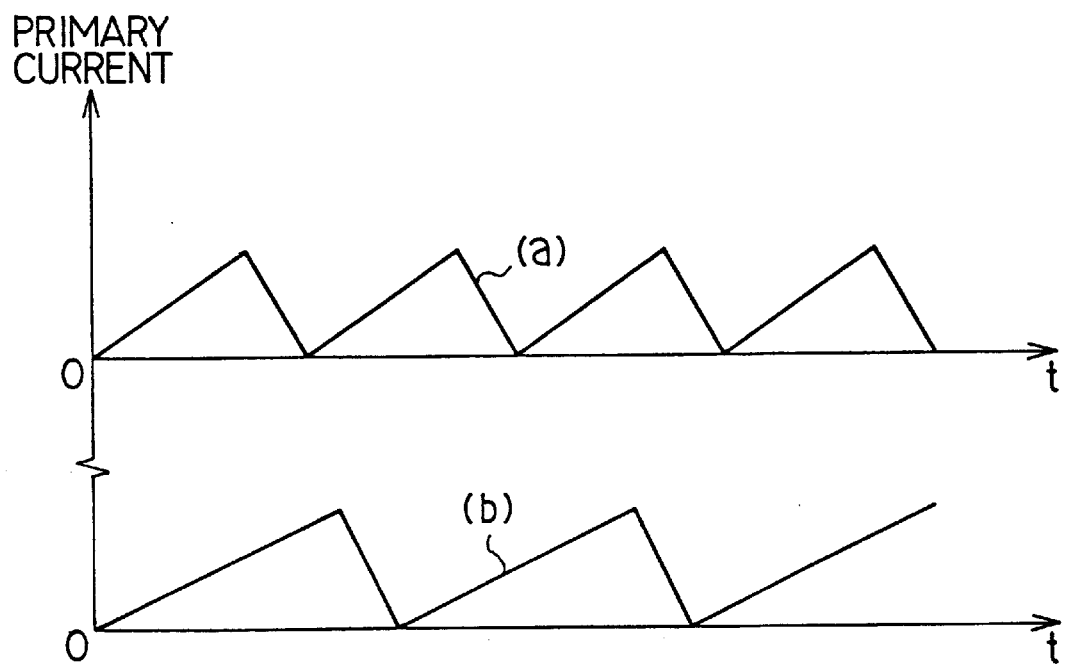
FIG. 13 is a time chart showing waveforms of primary current emerged in accordance with the sawtooth wave in FIG. 11.

According to the embodiment, the switching frequency of the MOS transistor 31 is lowered in accordance with lowering of the battery voltage and accordingly, as shown by (a) and (b) in FIG. 13, the primary current is sufficiently large not only when the battery voltage VB is sufficient but also when the battery voltage is lowered. Therefore, the total energy W per unit time capable of being supplied to the secondary winding 29b is increased. Since the frequency is lowered, a time period for making OFF the MOS transistor 31 is also prolonged and energy can sufficiently be supplied to the secondary winding 29b.

In this way, when the lamp 2 is turned on, the switching frequency of the MOS transistor 31 is set to a comparatively high predetermined frequency when the battery voltage VB is sufficient and the predetermined frequency is lowered in accordance with lowering of the battery voltage VB when the battery voltage VB is lowered and therefore, energy can sufficiently be supplied to the secondary side of the flyback transformer 29.

Accordingly, the energy consumption efficiency can be improved even in the case where the battery voltage VB is lowered when the lamp 2 is turned on and, for example, the lamp 2 can be restrained from being turned off in the midst of turning on the lamp 2.

(Threshold Level Setting Circuit 165)

A threshold level setting circuit 165 is provided with an inverting circuit 165a for inverting the instruction signal outputted from the lamp power control circuit 10 (error amplifying circuit 61), a limit value setting circuit 165b for setting the duty limit value (limit value) constituting the upper limit value of the duty ratio, control 65c for controlling the lamp voltage VL before turning on the lamp 2 to a predetermined value by constant voltage control and a control circuit 165c for controlling the lamp voltage VL before turning on the lamp 2 to a predetermined value by constant voltage control.

Further, the limit value is provided for sufficiently supplying energy to the secondary side of the flyback transformer 29. That is, the secondary side output of the flyback transformer 29 is in a predetermined relationship with the duty ratio. That is, for example, when the lamp power control circuit 10 functions to increase the duty ratio such that the lamp power is significantly increased, the limit value is set to prevent the secondary side output of the flyback transformer 29 from lowering conversely.

Figure 14:
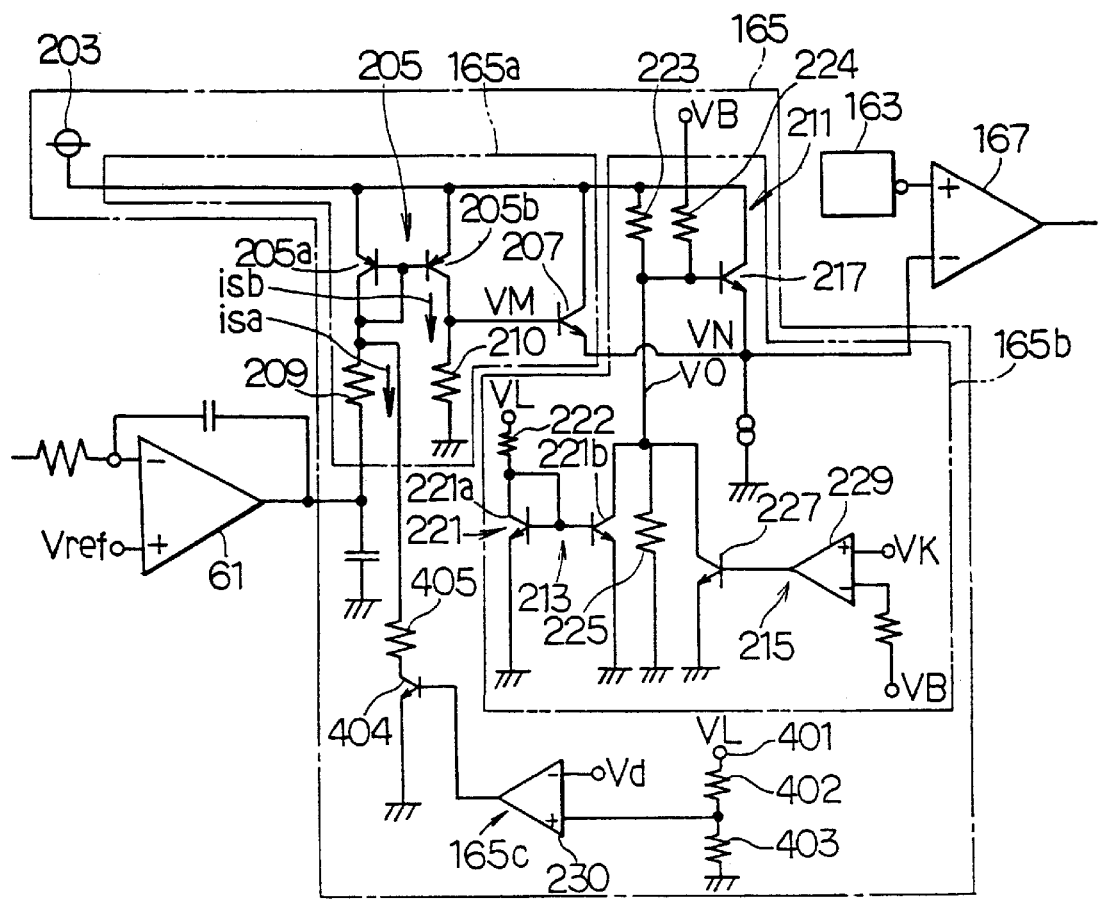
FIG. 14 is a circuit diagram of a threshold level setting circuit according to the embodiment.

In FIG. 14, an inverting circuit 165a comprises a current mirror circuit 205 where current flows from a constant voltage source 203 and an NPN transistor 207 where the current flowing in the current mirror circuit 205 constitutes the base current.

The output terminal of the error amplifying circuit 61 is connected to the current mirror circuit 205 comprising NPN transistors 205a and 205b via a resistor 209. In this case, when the lamp power is controlled by the output from the error amplifying circuit 61, a transistor 400 of the control circuit 165c is in an OFF state. Hence, the operation of the inverting circuit 165a in this case is as follows.

When the lamp power is lowered, the output voltage of the error amplifying circuit 61 is lowered and current isa flowing in the resistor 209 is increased. In this case, current isb which has mirrored the current in the current mirror circuit 205 becomes isa. Further, voltage VM produced by converting the current isb into voltage by a resistor 210 is increased and the voltage VM constitutes input voltage VN at an inverting input terminal of the comparator 167 via the transistor 207 forming an emitter follower circuit. Accordingly, the input voltage VN is increased, the threshold level is increased and the duty ratio is reduced.

When the lamp power is increased, the output voltage of the error amplifying circuit 61 is increased and the current isa flowing in the resistor 209 is reduced. Thereby, the voltage VM produced by converting the current isb into voltage by the resistor 210 is lowered. Accordingly, the input voltage VN of the inverting input terminal of the comparator 167 is lowered and the threshold level is lowered and the duty ratio is increased.

The limit value setting circuit 165b is provided with a first limit value setting circuit 211 for making variable the limit value in accordance with the battery voltage VB, a second limit value setting circuit 213 for making variable the limit value in accordance with the lamp voltage VL which is information corresponding to the power supplied to the lamp 2, and a third limit value setting circuit 215 for setting the limit value to a maximum value which can be set in view of the circuit when the battery voltage VB is a predetermined value or lower.

The first limit value setting circuit 211 detects only the battery voltage VB from the terminal A installed between the battery 1 and the primary winding 29a of the flyback transformer 29 (FIG. 1).

The first limit value setting circuit 211 is constituted by resistors 223–225. Voltage VO at a point connecting the resistors 223–225 is determined by voltage divided by the resistors 223–225 when a transistor 227 is turned off (when battery voltage is sufficient) and when the lamp voltage VL is 0 and becomes a value in correspondence with the battery voltage VB. Further, when the battery voltage VB is lowered, the voltage VO is lowered and when the battery voltage VB is high, the voltage VO is high.

The second limit value setting circuit 213 is constituted by a resistor 222 and a current mirror circuit 221 (NPN transistors 221a and 221b) in which only the lamp voltage VL indicating power supplied to the lamp 2 is detected from the terminal C. When the lamp voltage VL is increased, the second limit value setting circuit 213 sets the large limit value in accordance therewith.

That is, the current flowing in the current mirror circuit 221 is made variable in accordance with only the lamp voltage VL, the higher the lamp voltage, the more increased is the current. When the lamp voltage VL is increased, the collector current of the NPN transistor 221b of the current mirror circuit 221 is increased. Accordingly, the voltage VO is lowered by an amount of increasing the collector current of the NPN transistor 221b. Meanwhile, when the lamp voltage VL is reduced, the collector current of the NPN transistor 221b is reduced and the voltage VO is increased.

That is, when the voltage determined by the battery voltage VB and the lamp voltage VL is represented by VO and the voltage on the side of the base of the NPN transistor 207 in correspondence with the output voltage of the error amplifying circuit 61 is represented by VM, the threshold level setting circuit 165 achieves the following function. The voltage drop between the base and the collector of each of the NPN transistor 207 and the NPN transistor 217 is disregarded for brevity.

For example, it is assumed that the voltage VM is lowered to increase the lamp power by the output signal from the error amplifying circuit 61. Further, in this case, when the voltage VM is higher than the voltage VO, the NPN transistor 217 is turned off. Thereby, the input voltage VN becomes the voltage VM and the threshold level is set in accordance with the output signal of the error amplifying circuit 61.

Meanwhile, it is assumed that, for example, the voltage VM is lower than the voltage VO to significantly increase the lamp power by the output signal from the error amplifying circuit 61. Then, the NPN transistor 207 is turned off and the NPN transistor 217 is turned on. Thereby, the input voltage VN is the voltage VO and the voltage VO constitutes the limit value and the threshold level is limited such that it is not larger than the limit value.

That is, the first limit value setting circuit 211 corresponds only to the battery voltage VB, when the battery voltage VB is lowered, the voltage VO is also lowered and accordingly, the lower the battery voltage VB, the higher the limit value is set. Further, the second limit value setting circuit 213 corresponds only to the lamp voltage VL and the higher the lamp voltage VL, the lower the voltage VO and accordingly, the higher the lamp voltage VL, the higher the limit value is set.

In this way, for detecting the battery voltage VB, the terminal A is provided as shown in FIG. 1, and the limit value is made variable in accordance with the battery voltage VB detected by the terminal A. Thereby, the limit value can be set accurately in accordance with the battery voltage VB.

Further, for detecting only the lamp voltage VL, as shown in FIG. 1, the terminal C is installed and the limit value is made variable in accordance with the lamp voltage VL detected from the terminal C. Thereby, the limit value can be set accurately in accordance with the lamp voltage VL which is load of the lamp 2.

Further, control signal (VL) used in the lamp power control circuit 10 is utilized as the load of the lamp 2 and accordingly, means for detecting the load of the lamp 2 is not particularly needed to provide and cost reduction can be achieved.

Meanwhile, according to the first and the second limit value setting circuits 211 and 213, the limit values are set by circuit constants determined by, for example, the resistors 223, 225 and the like. Further, according to the example, the first limit value setting circuit 211 can set accurately the limit value during a time period where the battery voltage VB is lowered from a rated voltage of 12 V to approximately 7 V.

Accordingly, for example, when the battery voltage VB is significantly lowered and becomes smaller than 7 V, the limit value is not pertinent and the limit value needs to be increased further. That is, when the battery voltage VB is lowered further significantly, the output on the secondary side of the flyback transformer 29 is also significantly lowered and accordingly, the output on the secondary side cannot sufficiently be provided unless the limit value is increased in accordance therewith.

Hence, the limit value is pertinently set by the third limit value setting circuit 215 when the battery voltage VB is made lower than 7 V. The limit value in this case is set in a range where energy can sufficiently be supplied to the secondary winding 29b of the flyback transformer 29 when the duty ratio is increased as mentioned above.

As shown in FIG. 14, the third limit value setting circuit 215 comprises the NPN transistor 227 connected in parallel with the resistor 225 and a comparator 229 for turning on or off the NPN transistor 227.

According to the comparator 229, a predetermined voltage VK (7 V) is inputted to a noninverting input terminal and the battery voltage VB is inputted from the terminal A to an inverting input terminal. Therefore, when the battery voltage VB is lower than 7 V, the NPN transistor 227 is turned on. Thereby, the voltage VO becomes not the voltage divided by the resistor 223 and the resistor 225 but substantially 0 V.

As a result, the limit value is lowered to a value capable of setting the duty ratio substantially to 100%. Thereby, the optimum limit value can be set even when the battery voltage VB is lower than 7 V.

The control circuit 165c is a circuit for controlling the lamp voltage VL before turning on the lamp 2 to a predetermined value by constant voltage formation control (for example, 400 V). Further, a terminal 401 is a terminal for detecting the lamp voltage VL which is connected to the terminal C in FIG. 1. When the on/off switch SW is turned on and before the lamp 2 is turned on (state where no lamp current flows in the lamp 2), the voltage at the output terminal of the error amplifying circuit 61 becomes the highest voltage and no current flows in the resistor 209. That is, the error amplifying circuit 61 outputs an instruction signal for supplying maximum power to the lamp 2.

Therefore, the PWM control circuit 9 is operated under a state of the maximum duty determined by the second limit value setting circuit 165b. Thereby, when the direct current power source circuit 5 is operated and the lamp voltage VL is elevated to reach the predetermined value, the lamp voltage VL is controlled in constant voltage by the control circuit 165c.

In more detail, voltage produced by dividing the lamp voltage VL by resistors 402 and 403 is compared with a reference voltage Vd by a comparator 230 by which an NPN transistor 404 is controlled by on/off switching control. That is, when the lamp voltage VL is a predetermined value or lower, the NPN transistor 404 is turned off and when it is higher than the predetermined value, the NPN transistor 404 is turned on. When the NPN transistor 404 is turned on, current determined by a resistor 405 flows to the NPN transistor 205a. Further, the same current flows to the NPN transistor 205b, the voltage VM is elevated and the input voltage VN is elevated.

In this case, by setting the resistance value of the resistor 405, the output voltage VN is higher than a peak voltage (Va in FIG. 11) of the sawtooth wave inputted to the noninverting input terminal of the comparator 167. Accordingly, the output signal from the comparator 167 is fixed to the low level signal, the MOS transistor 31 is turned off and elevation of the lamp voltage VL is stopped.

Further, thereafter, when the lamp voltage VL is gradually lowered down to the predetermined value or less by power consumption at portions other than the lamp 2 with elapse of time, the NPN transistor 404 carries out the switching operation again and the lamp voltage VL is elevated. In this way, by repeating this operation the lamp voltage VL is controlled in constant voltage control.

(Fail-safe Circuit 14)

Figure 15:
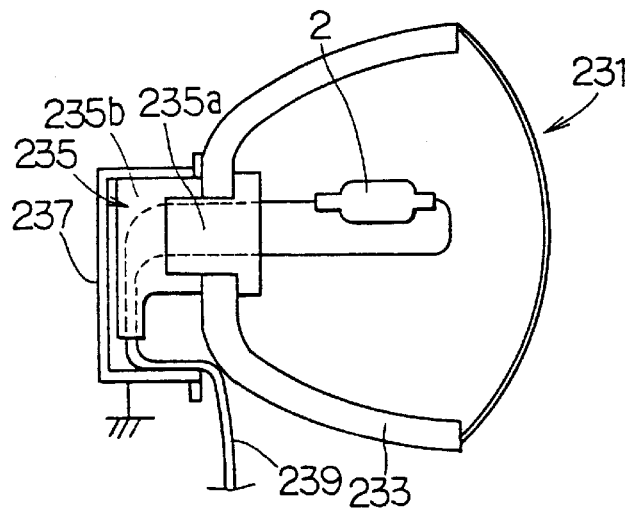
FIG. 15 is a schematic view showing a mounting structure for a lamp according to the embodiment.

Firstly, the lamp 2 is mounted on a vehicle which constitutes a premise of function of the fail-safe circuit 14. As shown in FIG. 15, a vehicular headlight 231 is provided with a reflector 233 for reflecting light from the lamp 2 toward the front side of a vehicle. The reflector 233 is formed in a bowl-like shape and incorporates the lamp 2 at inside thereof. The lamp 2 is inserted into the reflector 233 from the left side of FIG. 15 and is attached to the reflector 233 by a connector 235.

A connector 235 comprises attachable and detachable connector portions 235a and 235b and the connector portion 235a is inserted into the reflector 233 from the left side of FIG. 15 and is attached to the reflector 233 by rotating it after insertion. Thereafter, when the connector portion 235b is fitted to the connector portion 235a, the lamp 2 can be turned on.

A shield portion 237 formed by aluminum or the like is attached to cover the connector 235b. As shown in FIG. 15, the shield portion 237 is grounded and is attached to the connector portion 235b to push an electric wiring portion 239 of the lamp 2.

Here, the shield portion 237 prevents radio wave generated by turning on the lamp 2 from leaking to outside of the lamp 2 (reflector 233). Thereby, adverse influence by radio wave is prevented from being effected on the vehicle per se or other vehicle. In order to prevent generation of ratio wave, aluminum is deposited by vapor deposition on the inner face of the reflector 233 and the aluminum at that portion is grounded. Further, a shield portion in a cup-like shape is installed in the reflector 233 also on the front side of the vehicle of the lamp 2 by similar reason, although not illustrated.

According to the vehicular headlight 231, in interchanging the lamp 2 or the like, the electric wiring portion 239 of the lamp 2 is pinched by the shield portion 237 and the electric wiring portion 239 of the lamp 2 may be grounded.

As a result, overcurrent flows at, for example, the H-bridge circuit 7a via the primary winding 29a and the secondary winding 29b, enormous heat is generated at the H-bridge circuit 7a and the fuse 50 is melted and cut in the worst case.

Figure 16:
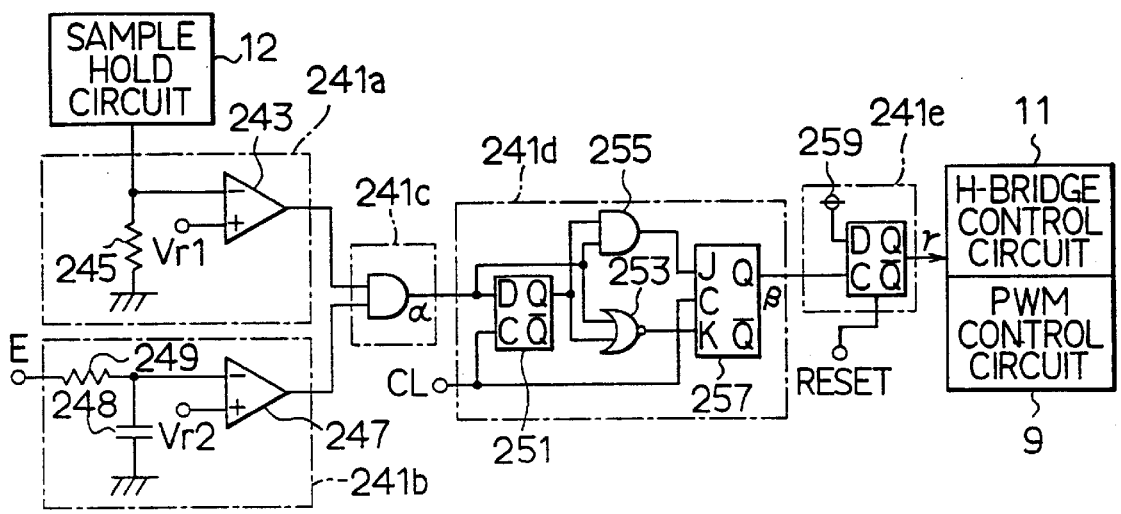
FIG. 16 is a circuit diagram for detecting abnormal state of the discharge lamp device according to the embodiment.

Hence, in order to deal with such an abnormal state, the following abnormality control is carried out by the fail-safe control circuit 14. As shown in FIG. 16, the fail-safe control circuit 241 is classified into five function blocks 241a–241e.

The function block 241a comprises a comparator 243 and a resistor 245. The lamp voltage VL is inputted from the sample hold circuit 12 to an inverting input terminal of the comparator 243 and a predetermined voltage Vr1 is inputted to a noninverting input terminal thereof. That is, the function block 241a is for determining whether it is a first state where the lamp voltage VL is smaller than a predetermined voltage Vr1 (for example, 20 V).

The function block 241b comprises a comparator 247, a capacitor 248 and a resistor 249. The lamp current IL (VIL in conversion of voltage) is inputted to an inverting input terminal of the comparator 247 and predetermined voltage Vr2 is inputted to a noninverting input terminal thereof. That is, the function block 241b constitutes current determining means for determining whether it is a second state where the lamp current IL is smaller than the predetermined current by comparing the voltage VIL with the predetermined voltage Vr2.

The function block 241c is an AND gate outputting a high level signal when both of outputs from the comparators 243 and 247 are high level signals. That is, the output signal from the AND gate 241c becomes the high level signal signifies that the abnormal state is detected. That is, the AND gate 241c is for detecting the abnormal state where the electric wiring portion 239 is grounded for detecting the abnormal state when the lamp voltage VL (voltage signal) is lower than the predetermined voltage value and the lamp current (current signal) is lower than the predetermined current value.

As described above, when the power of the lamp 2 is controlled, the lamp voltage VL is in a predetermined range of, for example, 20 V–400 V. In that case, when the electric wiring portion 239 is grounded, overcurrent flows on the secondary side of the flyback transformer 29 and the lamp voltage VL becomes lower than 20 V. Accordingly, in that case, the current wiring portion 239 may be grounded.

Further, as described above, when the power of the lamp 2 is controlled, the lamp current IL falls in a predetermined range (0.35–2.6 A). Overcurrent from the side of the secondary winding 29b is grounded from the electric wiring portion 243 without flowing to the H-bridge circuit 7a. Thereby, the lamp current IL becomes smaller than the predetermined range and becomes a predetermined current (for example, 0.2 A) or lower. Accordingly, in that case, the electric wiring portion 239 may be grounded.

Thus, the abnormal state is detected by the AND condition constituted by the lamp voltage VL and the lamp current IL. Further, the abnormal state is detected when both of the first state and second state are established. The abnormality is determined when both of the two states are satisfied by the following reason.

For example, when some abnormality is caused and both ends of the lamp 2 are shortcircuitted, the lamp voltage VL becomes smaller than the predetermined voltage Vrl, however, the lamp voltage IL becomes larger than the predetermined current. Further, when some abnormality is caused and the lamp 2 is opened, the lamp current IL becomes smaller than the predetermined current, however, the lamp voltage VL becomes larger than the predetermined voltage Vrl. Accordingly, it cannot be determined by either of the conditions whether the electric wiring portion 239 is grounded or whether the lamp 2 is shortcircuitted or opened.

Hence, in order to accurately detect grounding of the electric wiring portion 239, the abnormal state is determined when both of the first state and the second state are satisfied. Thereby, the abnormal state where the electric wiring portion 239 is grounded can firmly be grasped and overcurrent can be prevented from flowing accurately.

A time count circuit 241d comprises a D-type flip-flop 251, an NOR gate 253, an AND gate 255 and a JK-type flip-flop 257. The time count circuit 241d determines whether a time period satisfying both of the first state and the second state elapses for a predetermined time period T or more. Further, the same clock signal CL is inputted to clock terminals of the D-type flip-flop 251 and the JK-type flip-flop 257.

The reset circuit 241e is constituted by a D-type flip-flop. A constant voltage source 259 is inputted to a D input terminal of the D-type flip-flop reset circuit 241e. The H-bridge control circuit 11 is connected to an output terminal of the D-type flip-flop reset circuit 241e. Further, the constant voltage source 259 generates constant voltage (for example, 5 V) when the on/off switch SW is turned on.

Figure 17:
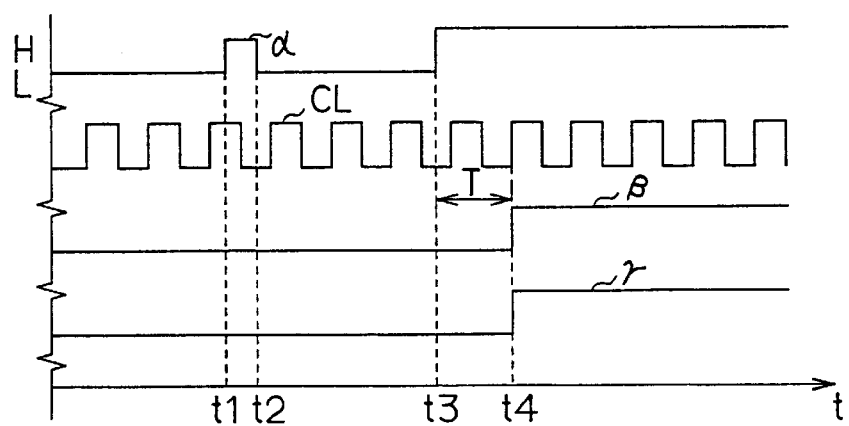
FIG. 17 is a time chart shoeing abnormality detection in the circuit shown in FIG. 16.

In operation, as shown in FIG. 17, the output signal from the AND gate 241c is designated by notation α, the output signal from the JK-type flip-flop 257 is designated by notation β and the output signal from the D-type flip-flop 241e is designated by notation γ. Further, when the on/off switch SW is turned on, the D-type flip-flop reset circuit 241e is reset by a reset signal from a reset circuit, not illustrated. Further, according to the embodiment, when the output signal γ from the D-type flip-flop reset circuit 241e is a high level signal, the H-bridge circuit 7a is turned off by the H-bridge control circuit 11.

First, assume that the on/off switch SW is turned on, for example, time point t3 is reached, the electric wiring portion 239 is grounded again, the output signal α is changed from the low level signal to the high level signal and the state continues thereafter. Further, when the state where the output signal a is a high level signal continues for longer than one period time of the clock pulse CL, the output signal β from the JK-type flip-flop 257 is inverted to the high level signal via the AND gate 255c and the NOR gate 253. Then, the output signal γ from the D-type flip-flop 241e becomes the high level signal. Thereby, as shown in FIG. 4, the low level signals are outputted from the two output terminals of the first circuit for abnormality 242 to the IC elements 43a and 43b and the H-bridge circuit 7a is turned off.

Thereby, overcurrent produced by grounding the electric wiring portion 239 is interrupted by the MOS transistors 41a and 41c. As a result, overcurrent larger than a predetermined value can be prevented from flowing in the H-bridge circuit 7a and a current path after the H-bridge circuit 7a, the fuse 50 can be prevented from being melted and cut and enormous heat can be prevented from generating at the discharge lamp device 100.

In addition thereto, when the output signal γ becomes the high level signal, control operation of the PWM control circuit 9 is stopped, that is, conduction to the MOS transistor 31 is interrupted. Specifically, as shown in FIG. 5, when such an abnormal state is caused, the NPN transistor 246 is turned on by outputting the high level signal by the second circuit for abnormality 244. Accordingly, the NPN transistors 115 and 116 are turned off regardless of the output signal from the PWM control circuit 9. Thereby, conduction of the MOS transistor 31 is interrupted and power supply to all of discharge lamp device 100 is stopped.

More specifically, it is assumed that a certain contact resistance is present between the electric wiring portion 239 and the shield 237 when the electric wiring portion 239 is grounded. Further, it is assumed that energy (power) on the secondary side of the flyback transformer 29 is consumed in a large amount by the constant resistance. Then, the lamp power control circuit 9 controls to increase the duty ratio of the PWM control circuit 9 to increase energy stored in the primary winding 29a. Thereby, there causes a problem where excessive current flows in the primary winding 29a of the flyback transformer 29.

Hence, in consideration of such a case, the control operation of the PWM control circuit 9 is stopped, that is, conduction at the MOS transistor 31 is interrupted and accordingly, the primary current can be prevented from becoming excessively large.

Further, various modes are conceivable with regard to the abnormal state other than the above-described, for example, when the withstand voltage of the MOS transistor 31 is deteriorated, the lamp voltage necessary for starting to turn on the lamp (for example, 400 V) cannot be generated and the lamp cannot be turned on. In this case, the MOS transistor 31 carries out switching operation by being provided with the drive signal having a maximum duty ratio from the PWM control circuit 9, however, since the withstand voltage is deteriorated, almost all of energy stored to the primary winding 29a is consumed by the MOS transistor 31 per se and when the operation is continued as it is, heat is generated abnormally and the MOS transistor 31 is destructed by shortcircuit. As a result, secondary failure of melting and cutting of the fuse 50 or the like is resulted.

Under such an abnormal state, the result remains unchanged even when the H-bridge circuit 7a is turned off. Therefore, in the case of such an abnormal state, the control operation of the PWM control circuit 9 is stopped and the MOS transistor 31 is held in an OFF state by which the secondary failure can be avoided.

In this way, in the various abnormal states, there is a case where it is effective to turn off the H-bridge circuit 7a by the result of abnormal determination and there is a case where it is effective to make OFF the MOS transistor 31 and it can be selected whether the H-bridge circuit 7a is turned off or whether the MOS transistor 31 is turned off in accordance with the abnormal state. However, in the case of selecting the countermeasures, the circuit is complicated and the scale is enlarged and accordingly, it is not advisable. Therefore, in the case of the abnormal determination, all of the H-bridge circuit 7a is turned off and at the same time the MOS transistor 31 is turned off by which the circuit can be simplified and the scale can be downsized.

Further, it is assumed that as shown in FIG. 17, at time point t1, the electric wiring portion 239 is grounded and the output signal a is changed from the low level signal to the high level signal and the state continues until time point t2.

In this case, a time period where the signal α that is the input signal to the time count circuit 241d is at high level is shorter than a time period of one cycle of the clock pulse CL and accordingly, the output signal § from the time count circuit 241d is not changed and maintains the previous state. Accordingly, the signal γ also remains unchanged similarly. That is, no influence is effected in the H-bridge control circuit 11.

That is, the condition of turning off the H-bridge circuit 7a described above is produced when a time period where both of the first state and the second state are established elapses the predetermined time T. The reason for such a condition is as follows.

For example, it is assumed that when the on/off switch SW is turned on, after the first state and the second state are established for the first time, the state recovers from the grounding of the electric wiring portion 239 in a short period of time and the electric wiring portion 239 becomes normal. In this case, in order to ensure the visual recognizability of a passenger at night, the lamp 2 needs to maintain the turn on state as long as possible.

Hence, in the case of abnormality in a short period of time, the H-bridge circuit 7a is prevented from being turned off at once and the H-bridge circuit 7a is turned off for the first time when the first state and the second state elapse for the predetermined time T. Further, the predetermined time T is set to a time period within a range where the fuse 50 is not melted and cut and accordingly, the fuse 50 can be prevented from being melted and cut beforehand.

Further, the predetermined time T is set as follows. According to the embodiment, the abnormal state is detected by a comparatively simple circuit constitution as shown in FIG. 15.

However, as shown in FIG. 2, the electric wiring portion 239 is provided with wiring portions 239a and 239b at both ends of the lamp 2, both of the two wiring portions 239a and 239b are rarely grounded at the same time and, for example, only one of the electric wiring portion 239a in FIG. 1 is frequently grounded. Therefore, when the polarity of the discharge voltage of the lamp 2 is changed by the H-bridge circuit 7a during a time period where, for example, the abnormal state continues, the lamp voltage VL becomes higher than the predetermined voltage Vr1.

Accordingly, the first state is not produced regardless of whether the abnormal state occurs and accordingly, the output signal from the AND gate 241c does not become the high level signal and the abnormal state cannot be detected.

Hence, according to the embodiment, the predetermined time T is made shorter than the cycle time of switching the H-bridge circuit 7a and is set to a half or less (0.8 ms) of the time period for the switching cycle. Thereby, the abnormal state can firmly be detected by the simple circuit constitution.

Further, in order to detect the abnormal state, the lamp voltage VL and the lamp current IL which are control signals of the lamp power control are used. Thereby, a voltage detecting circuit or a current detecting circuit needs not to prepare separately for determining the abnormality.

(Connector Detachment Detecting Circuit 15)

The lamp 2 can be detached by the connector 235 comprising the two connector portions 235a and 235b in the case of destruction, failure or the like. Accordingly, when the connector portions 235a and 235b are fitted in, the lamp 2 can be turned on by being electrically connected to the battery 1.

Figure 18:
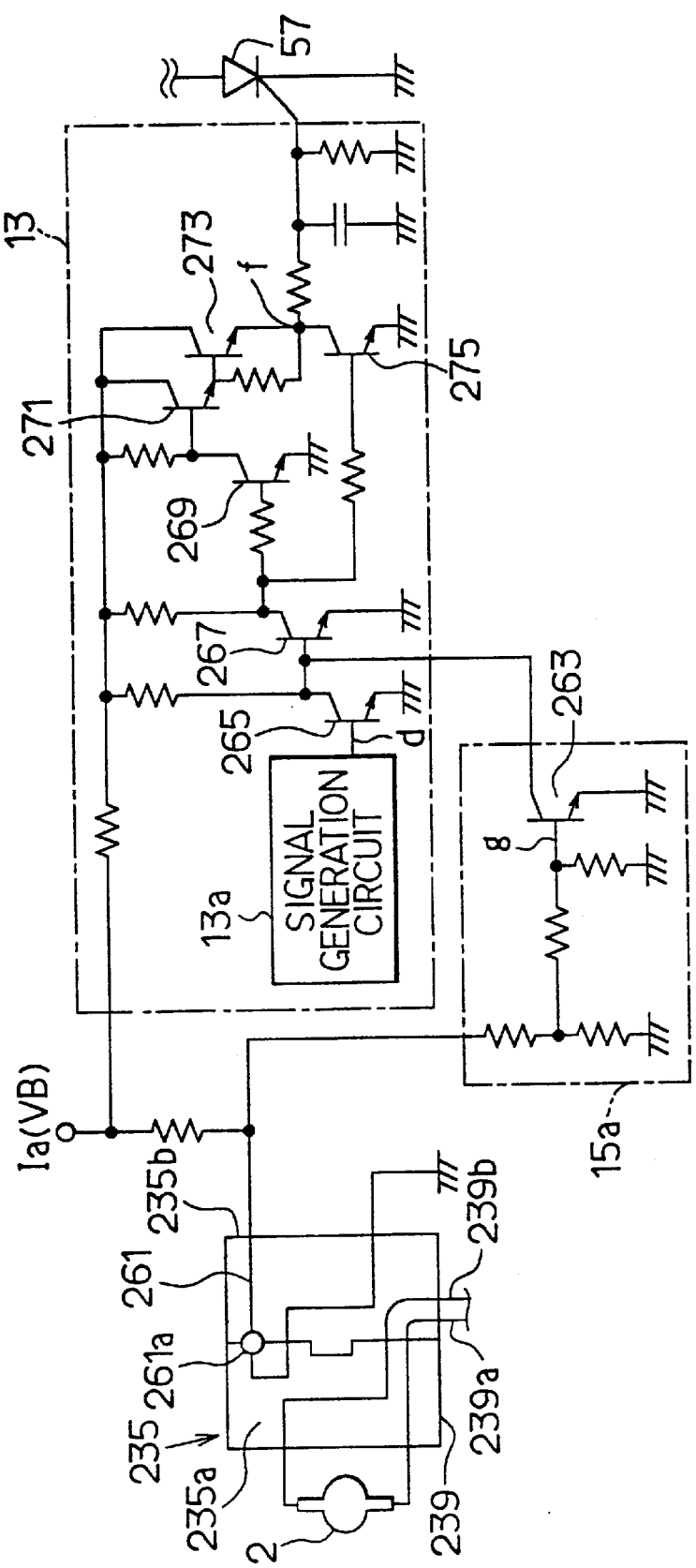
FIG. 18 is a circuit diagram for detecting detachment of a connector according to the embodiment.

As shown in FIG. 18, the electric wiring portion 261 is formed at inside of the connector 235 such that electric conduction at the inside is interrupted when the connector portions 235a and 235b are detached. Specifically, one end side of the electric wiring portion 261 is connected to the power source terminal 1a. Further, other end side of the electric wiring portion 261 is grounded.

A connection point 261a in the electric wiring portion 261 for connecting the respective connectors 235a and 235b constitutes a connector detachment detecting terminal for detecting detachment of the connector 235 and when the connector portions 235a and 235b are detached, a transistor 263 of a detachment detecting circuit 15a built in the connector detachment detecting circuit 15 is changed from OFF to ON. Further, the detachment detecting circuit 15a is installed between a signal generating circuit 13a and the starting circuit 8 and when detachment of the connector 235 is detected, a signal from the signal generating circuit 13a constitutes a signal for forcibly stopping operation of the starting circuit 8.

The high voltage generation control circuit 13 is provided with the signal generating circuit 13a for generating the signal for driving the gate of the thyristor 57 and outputting the signal in synchronism with timings of turning on/off switch of the H-bridge circuit 7a. Further, the signal generating circuit 13a repeats to make on/off switching of the thyristor 57 by the signal generating circuit 13a until the lamp 2 is turned on, for example, in the case where the lamp 2 is not turned on and remains turned off even when the starting circuit 8 is started by which high voltage is applied to the lamp 2.

When the high level signal is generated at the signal generating circuit 13a, a transistor 265 is turned on. Thereby, a transistor 267 is turned off and transistors 269 and 275 are turned on. Further, transistors 271 and 273 are turned off.

As a result, the signal for driving the gate of the thyristor 57 becomes the low level signal and the thyristor 57 is turned off.

When the low level signal is generated at the signal generating circuit 13a, the transistor 265 is turned off. Thereby, the transistor 267 is turned on and the transistors 269 and 275 are turned off. Further, the transistors 271 and 273 are turned on. As a result, the signal for driving the gate of the thyristor 57 becomes the high level signal and the thyristor 57 is turned on.

In this way, when the signal generated by the signal generating circuit 13a is the high level signal, the gate drive signal becomes the low level signal and the thyristor 57 is turned off. Meanwhile, when the signal generated by the signal generating circuit 13a is the low level signal, the gate drive signal becomes the high level signal and the thyristor 57 is turned on.

Further, the signal for driving the gate of the thyristor 57 can forcibly be made to be the low level signal by the signal for turning on the transistor 263. That is, when the connector 235 is detected to detach by the detachment detecting circuit 15a, in the case where the transistor 263 is turned on, the transistor 267 is turned off even when the low level signal for turning on the thyristor 57 is generated at the signal generating circuit 13a.

Accordingly, the transistors 269 and 275 are turned on, the transistors 271 and 273 are turned off and the thyristor 57 is turned off. As a result, for example, when the lamp 2 is turned off by detachment of the connector 235, generation of high voltage by the thyristor 57 can be prevented beforehand.

When the connector 235 is detected as detached in the case of contact failure of the electric wiring portion 261, the function of turning on the lamp 2 is normal. Further, in such a case, the lamp 2 needs not to turn off by stopping the control operation of the PWM control circuit 9 but conversely, it is preferable to maintain to turn on the lamp 2.

Hence, in parallel with detection of detachment of the connector 235, the abnormal state where the lamp 2 is turned off even when the on/off switch SW is set to ON, is detected by the fail-safe circuit 14. That is, it is determined whether the lamp 2 is turned off not by contact failure of the electric wiring portion 261 but by true detachment of the connector 235 when the connector 235 is detected as detached by the connector detachment detecting circuit 15.

The fail-safe circuit 14 comprises a comparator 277 constituting turn-on detector, a delay circuit (timer circuit) 279, an OR gate 281 and a D-type flip-flop 241e.

Predetermined voltage VR is inputted to a noninverting input terminal of the comparator 277. Meanwhile, the terminal E (FIG. 1) is connected to an inverting input terminal of the comparator 277. That is, according to the comparator 277, the low level signal is outputted when the lamp 2 is turned on and the lamp current flows and outputs the high level signal as regarding that the lamp 2 is turned off when the lamp current is a predetermined value or lower.

The delay circuit 279 outputs the high level signal when the output signal from the comparator 277 is the high level signal and the high level signal continues for a predetermined time period of Tm. That is, the delay circuit 279 outputs the high level signal when a time period where the lamp 2 is turned off elapses the predetermined time period Tm.

The OR gate 281 outputs the high level signal when the output signal from the delay circuit 279 becomes the high level signal. When the output signal from the OR gate 281 becomes the high level signal, the D-type flip-flop 241e outputs the high level signal with the high level signal as a clock pulse. Further, when the output signal from the D-type flip-flop 241e becomes the high level signal, the control operation of the PWM control circuit 9 constituting power controlling means for supplying power from the battery 1 to the lamp 2 is stopped (turn off the MOS transistor 31) and the H-bridge circuit 7a is turned off by the first circuit for abnormality 242.

In this way, when the lamp 2 is turned off from the state of turning on and the turn off time period elapses the predetermined time period of Tm, power supply to the lamp 2 is stopped by stopping the control operation of the PWM control circuit 9. Further, the control operation of the PWM control circuit 9 is continued and power is supplied to the lamp 2 until the predetermined time period Tm elapses after turning off the lamp 2.

Figure 19:
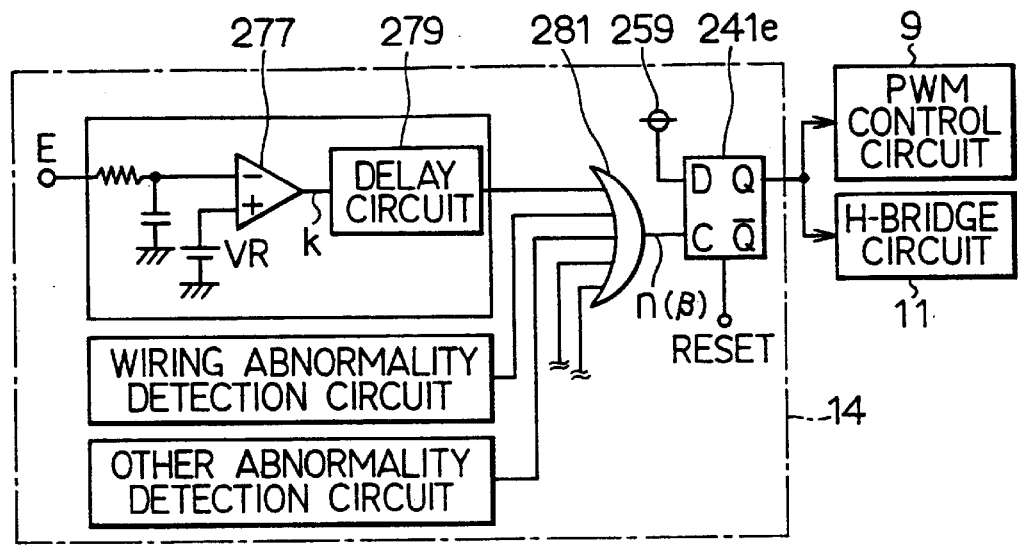
FIG. 19 is a circuit diagram for detecting abnormal state where the connector is detached according to the embodiment.

Further, as shown in FIG. 19, an input terminal in correspondence with the abnormal state of wiring where the electric wiring portion 261 is grounded as mentioned above and an input terminal in correspondence with other abnormal state are installed to the OR gate 281. That is, the OR gate 281 is installed between the JK-type flip-flop 257 and the D-type flip-flop 241e shown in FIG. 16.

Figure 20:
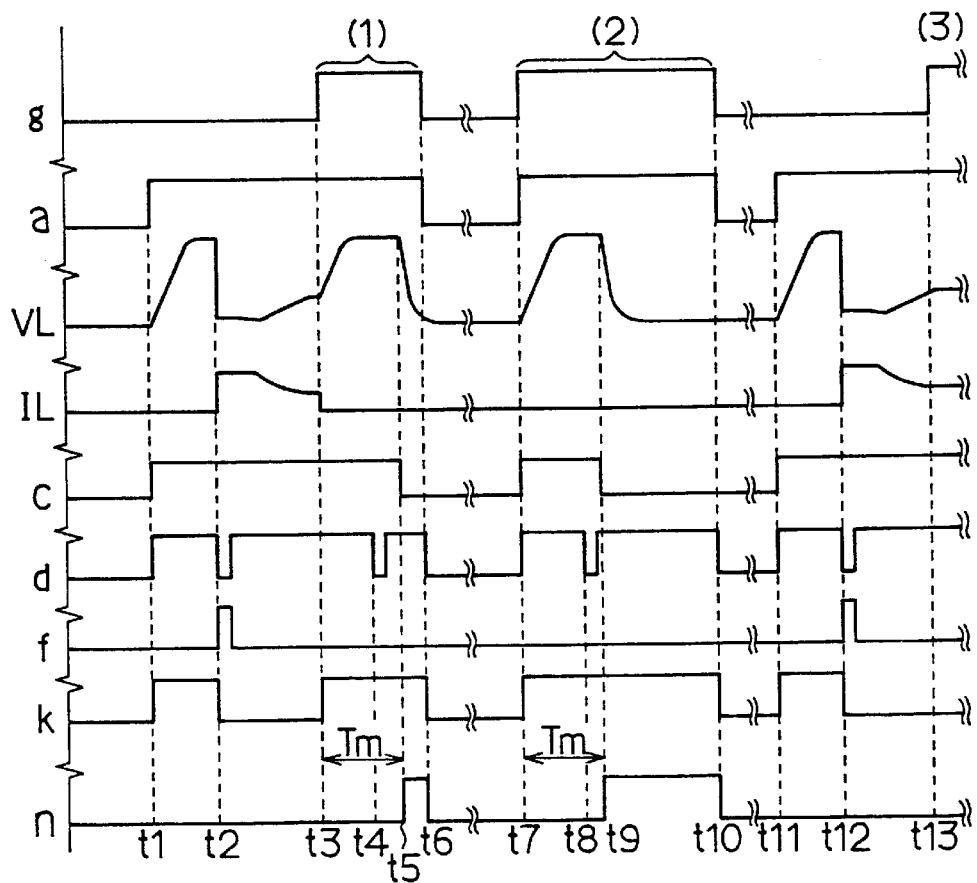
FIG. 20 is a time chart showing detection of connector detachment in FIGS. 18 and 19.

The detachment detecting circuit 15a, the high voltage generation control circuit 13 and the fail-safe circuit 14 operates as shown in FIG. 20.

The signal detected by the detachment detecting circuit 15a is designated by notation "g", which is the high level signal when the connector 235 is detached and the low level signal when the connector is not detached, the signal for driving the gate of the thyristor 57 is designated by notation "f" and the signal of the on/off switch SW is designated by "a" which is the high level signal when the on/off switch SW is turned on and the low level signal when it is turned off.

Further, the output signal from the signal generating circuit 13a is designated by notation "d", the control signal from the PWM control circuit 9 is designated by notation "c", which is the high level signal when control operation of the PWM control circuit 9 is carried out and the low level signal when the control operation is stopped, the output signal from the comparator 277 is designated by notation "k" which is the high level signal when the lamp 2 is turned off and the low level signal when the lamp 2 is turned on. Further, the input signal to C terminal of the D-type flip-flop 241e is designated by notation "n".

First, when the on/off switch SW is turned on at time point t1, the lamp voltage VL gradually increases, for example, at time point t2, the signal "f" for driving the gate of the thyristor 57 becomes the high level signal. Thereby, the lamp 2 is turned on and the lamp current IL starts flowing. Thereafter, assume that the lamp is brought into a stable control state (35 W), the signal "g" becomes a high level signal at time point t3 and detachment of the connector 235 is detected ((1) in FIG. 20).

Further, at time point t3, the lamp current IL becomes smaller than the predetermined value, for example, becomes 0 and the lamp 2 is turned off, that is, in the case where no contact failure occurs at the electric wiring portion 261 and the connector 235 is truly detached, the signal "k" becomes the high level signal. However, at this moment, the signal "n" remains as the low level signal by the delay circuit 279 and the control operation of the PWM control circuit is continued.

Thereby, when the lamp 2 is turned off, as shown in FIG. 20, at time point t4, the signal "d" from the signal generating circuit 13a changes the thyristor 57 from OFF to ON and is switched from the high level signal to the low level signal to turn on the lamp 2 again.

However, when detachment of connector is detected, the signal "f" becomes the low level signal since the signal "g" becomes the high level signal regardless of whether the lamp 2 is turned on. Accordingly, when detachment of the connector 235 is detected, discharge of the capacitor 53 by the starting circuit 8 is stopped and generation of high voltage at the connector 235 can be prevented.

Further, when at time point t5, the time period of continuing to turn off the lamp 2 has elapsed the predetermined time period of Tm, the signal "n" becomes the high level signal, the control operation of the PWM control circuit 9 is stopped and further, the H-bridge circuit 7a is turned off. That is, when the connector 235 is detached and the lamp 2 is turned off, the thyristor 57 is turned off, after the predetermined time period of Tm has elapsed, the control operation of the PWM control circuit 9 is stopped and power supply to the lamp 2 is stopped.

Thereby, when the electric wiring portion 261 of the lamp 2 causes contact failure for a short period of time, the power supply to the lamp 2 is maintained and the lamp 2 can be maintained to turn on and when the lamp 2 continues to turn off for the predetermined time period of Tm, power supply to the lamp 2 can swiftly be stopped.

Next, it is assumed that from the state of (1), that is, the state where the connector 235 is actually detached, the on/off switch SW is turned off once at time point t6 and turned on again at time point t7. ((2) in FIG. 20)

Then, the lamp voltage VL gradually increases, at time point t8, the signal "d" from the signal generating circuit 13a makes the thyristor 57 from OFF to ON and is switched from the high level signal to the low level signal to turn on the lamp 2. However, when the connector detachment is detected, the signal "g" becomes the high level by which the signal "f" becomes the low signal regardless of whether the lamp 2 is turned on as mentioned above. Accordingly, when the connector 235 is detached, generation of high voltage at the connector 235 can be prevented by the starting circuit 8.

Thereafter, when the time period of continuing to detect detachment of the connector 235 has elapsed for the predetermined time period of Tm at time point t9, the signal "n" becomes the high level signal, the control operation of the PWM control circuit 9 is stopped and the H-bridge circuit 7a is turned off.

Next, it is assumed that from the state of (2), that is, the state where the connector 235 is actually detached, the on/off switch SW is turned off once at time point t10, the connector 235 is refitted and the switch is turned on again at time point t11. ((3) in FIG. 20)

Then, at time point t12, the signal "f" becomes the high level signal since the signal "g" becomes the low level signal as mentioned above and the lamp 2 is turned on by the starting circuit 8. It is assumed that thereafter, for example, at time point t13, the electric wiring portion 261 is brought into contact failure. In this case, the lamp 2 is turned on and the lamp current is larger than the predetermined value and accordingly, the signal "k" is the low level signal.

Accordingly, when the electric wiring portion 261 causes contact failure, in the case where the lamp 2 is turned on, power supply to the lamp 2 is maintained. As a result, even when contact failure is caused at the electric wiring portion 261, the lamp 2 can be maintained to turn on when no abnormality is caused in the function of turning on the lamp 2.

(Reverse Connection Protecting Circuit 3)

Figure 21:
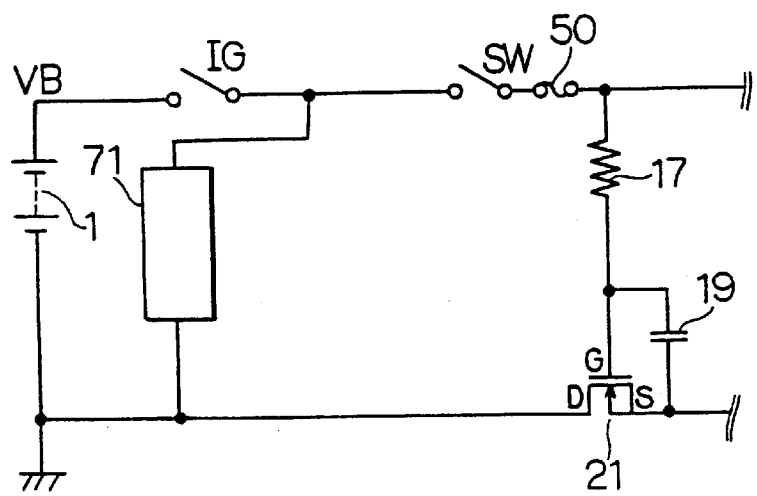
FIG. 21 is a circuit diagram of a reverse connection protecting circuit according to the embodiment.

In FIG. 21, an electric load 71 such as an alternator or the like which is a vehicular electric device is added to the circuit in FIG. 1.

The reverse connection protecting circuit 3 is installed between the battery 1 and the lamp 2. The gate (G) of an MOS transistor 21 is connected to the anode side (power source terminal 1a) of the battery via the resistor 17. The source (S) and the drain (D) of the MOS transistor 21 are connected to the side of the ground terminal 1b and current flowing through the discharge lamp device 100 flows from the source to the drain.

When the on/off switch SW is turned on, the gate voltage is applied from the battery 1 to the gate (G), the MOS transistor 21 is brought into a conductive state and the power of the battery 1 is supplied to the discharge lamp device 100. Thereby, the discharge lamp device 100 is operated.

A capacitor 19 which is a conduction member is connected in parallel between the gate and the source of the MOS transistor 21. The resistor 17 is connected between the power source terminal 1a and the gate of the MOS transistor 21 in series with the parallel connection of the MOS transistor 21 and the capacitor 19.

Further, when the on/off switch SW is turned on, the capacitor 19 is charged via the resistor 17. As the path of current for charging the capacitor 19, current flows from the anode side of the battery 1 to the cathode side of the battery 1 via the resistor 17, the capacitor 19, and a parasitic diode between the source and the drain of the MOS transistor 21. Further, when the voltage of charging the capacitor 19 reaches a predetermined value, the MOS transistor 21 is turned on. Also, current flowing through the discharge lamp device 100 flows across the parasitic diode between the source and the drain of the MOS transistor 21 until the MOS transistor 21 is turned on.

The MOS transistor 21 is provided with protecting function for protecting the discharge device 100 in the following case such that reverse voltage is not applied thereon.

For example, it is assumed that in interchanging the battery 1, the battery 1 is attached with the polarities inverted erroneously and the on/off switch SW is turned on by operation of the passenger under the state. In this case, the reverse voltage applied to the discharge lamp device 100 is the battery voltage VB (first reverse voltage).

Further, when the battery 1 is attached to the discharge lamp device 100 with the polarities inverted in this way, application of reverse voltage to the discharge lamp device 100 is blocked by the withstand voltage between the drain and the source of the MOS transistor 21 by which the discharge lamp device 100 is protected. In this way, overcurrent does not flow in the fuse 50 via a zener diode as in the conventional case and melting and cutting of the fuse 50 can be prevented beforehand.

The alternator 71 is connected to the battery 1 in parallel with the discharge lamp device 100. The alternator 71 is an inductive load (vehicular electric device) having a reactance component of a field coil or the like, not illustrated, which starts generating electricity when an ignition switch IG for starting a drive source for running a vehicle is turned on.

Further, when the ignition switch IG is turned off from the state where the ignition switch IG is turned on and the on/off switch SW is turned on, a large pulse voltage of negative polarity is generated at the power source terminal 1a since current flowing in the alternator 71 is cut off. Therefore, reverse voltage larger than that in reversely connecting the battery 1 is applied to the discharge lamp device 100.

However, in this case, electric charge charged to the capacitor 19 is discharged by a time constant determined by the capacitor 19 and the resistor 17. Thereby, the gate voltage is applied to the gate of the MOS transistor 21 for a predetermined time period and accordingly, the conductive state of the MOS transistor 21 is maintained for a predetermined time period.

Further, when large pulse voltage is instantaneously generated between the power source terminal 1a and the ground terminal 1b, pulse current flows through a current path of the parasitic diode between the source and the drain of the MOS transistor 315 via the MOS transistor 21 which is turned on, the primary winding 29a of the flyback transformer 29 and the coil 27 by which energy of negative polarity pulse is consumed.

In this way, when large reverse voltage is generated between the power source terminal 1a and the ground terminal 1b, the MOS transistor 21 is forcibly maintained in the conductive state by the capacitor 19 and accordingly, the withstand voltage of the MOS transistor 21 needs not to consider at all.

That is, the withstand voltage may be to a degree by which reverse voltage is not applied to the discharge lamp device 100 when the battery 1 is connected in reverse (for example, 12 V or more).

Accordingly, the withstand voltage of the MOS transistor 21 can considerably be reduced by which the drive resistance of the MOS transistor 21 can be reduced and power loss at the MOS transistor can be reduced. As a result, the chip size of the MOS transistor 21 can be reduced and an inexpensive one of the MOS transistor 21 can be used.

Further, the MOS transistor 21 is forcibly brought into a conductive state by the capacitor 19 and the discharge time period of the capacitor 19 can be prolonged by the resistor 17 since the capacitor 19 and the resistor 17 constitute a time constant circuit. As a result, the time period of conducting to the MOS transistor 21 can be prolonged and accordingly, destruction of the MOS transistor 21 can firmly be prevented. Further, when the time constant of the time constant circuit is set to 0.01 second or longer, during a time period where the pulse voltage is generated, the MOS transistor 21 can be brought into ON state without fail and the discharge lamp device 100 can be protected assuredly.

(Overvoltage Protecting Circuit 16)

Figure 22:
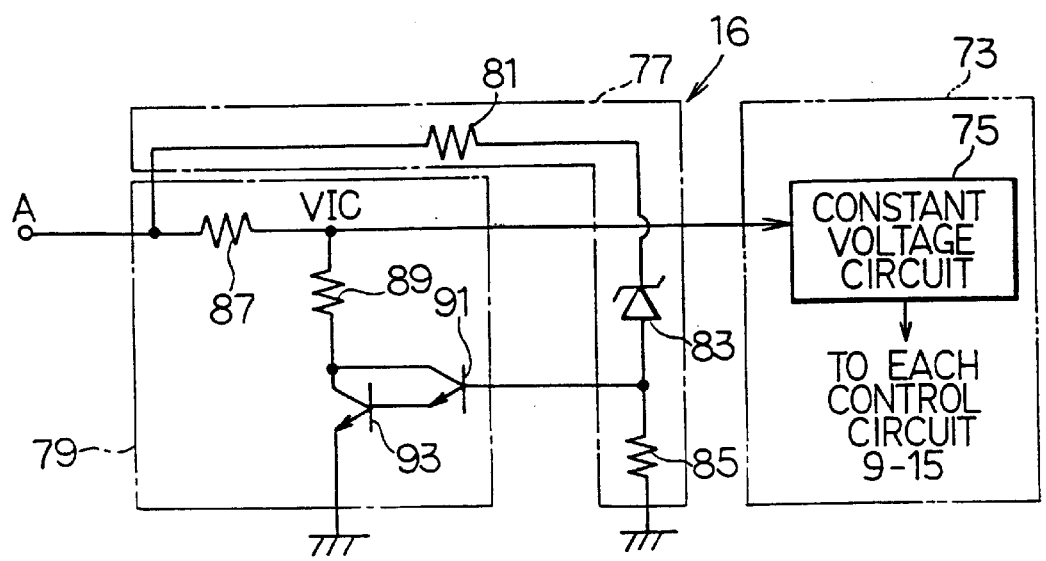
FIG. 22 is a circuit diagram of an overvoltage protecting circuit according to the embodiment.

The overvoltage protecting circuit 16 shown in FIG. 22 protects the respective circuits 9–15 installed to an integrated circuit 73 against overvoltage. The overvoltage protecting circuit 16 is installed with an overvoltage detecting circuit 77 for detecting overvoltage when the primary side voltage becomes a predetermined threshold value voltage and a voltage dividing circuit 79 for dividing the primary side voltage when the primary side voltage becomes the threshold value voltage. Further, the primary side voltage applied via the overvoltage protecting circuit 16 is made constant by a constant voltage circuit 75 and is used in voltage for driving the respective control circuits 9-15.

The overvoltage detecting circuit 77 is constituted by a resistor 81 having a comparatively large resistance value, a zener diode 73 and a resistor 85. The threshold value voltage is set by zener diode voltage of the zener diode 83. Further, the resistor 81 is installed in series with the zener diode 83 for limiting the current I by which the withstand voltage of the zener diode 83 can be lowered. Further, the resistor 85 is a reverse bias resistor for preventing leakage.

Further, the voltage dividing circuit 79 is constituted by resistors 87 and 89 and NPN transistors 91 and 93 in Darlington connection.

When the primary side voltage is less than the predetermined threshold value voltage, no current flows in the zener diode 83 and accordingly, the NPN transistors 91 and 93 in Darlington connection are not turned on. Therefore, the voltage VIC applied to the constant voltage circuit 75 in the integrated circuit 73 is voltage of the primary side voltage subtracted by voltage drop at the resistor 87.

Further, when the primary side voltage rises to the predetermined voltage or higher, the zener diode 83 flows current by the zener breakdown and the NPN transistors 91 and 93 are turned on. Accordingly, the voltage VIC applied to the constant voltage circuit 75 in the integrated circuit 73 becomes voltage produced by dividing the primary side voltage by the resistor 87 and the resistor 89. Resistance values of the resistor 87 and the resistor 89 need be set such that the divided voltage is the withstand voltages of the respective control circuits 9–15 or lower.

Although it is shown that the constant voltage circuit 75, the respective control circuits 9–15 and the like are formed in the integrated circuit 73, the constituent elements of the overvoltage protecting circuit 16 such as the zener diode 83, the resistor 85, the NPN transistors 91 and 93 and the like may also be formed in the integrated circuit 73. In this case, the respective constituent elements may be formed along with other portions of the integrated circuit and accordingly, further cost reduction can be achieved.

In this way, overvoltage is divided by the dividing circuit 79 and accordingly, the overvoltage can be prevented from being applied to the integrated circuit 73.

Thereby, even when a power zener diode having comparatively high withstand voltage is not used, the respective control circuits 9–15 in the integrated circuit 73 can be protected against overvoltage and cost reduction can be achieved. Further, almost no current flows in the resistor 81 of the overvoltage detecting circuit 77 except when overvoltage is generated and accordingly, power consumption of the resistor 81 can be prevented when no overvoltage is generated.

(Inspection of Discharge Lamp Device)

Figure 23:
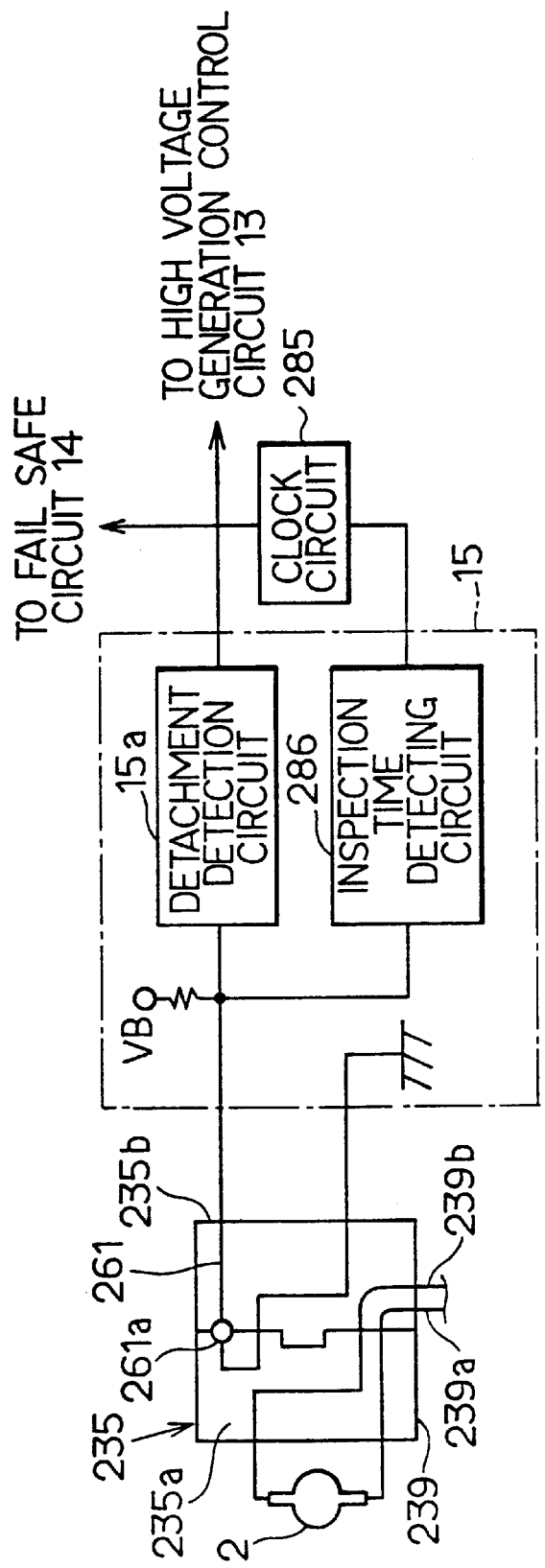
FIG. 23 is a detailed diagram of essential portions of the connector detachment detecting circuit according to the embodiment.
Figure 24:
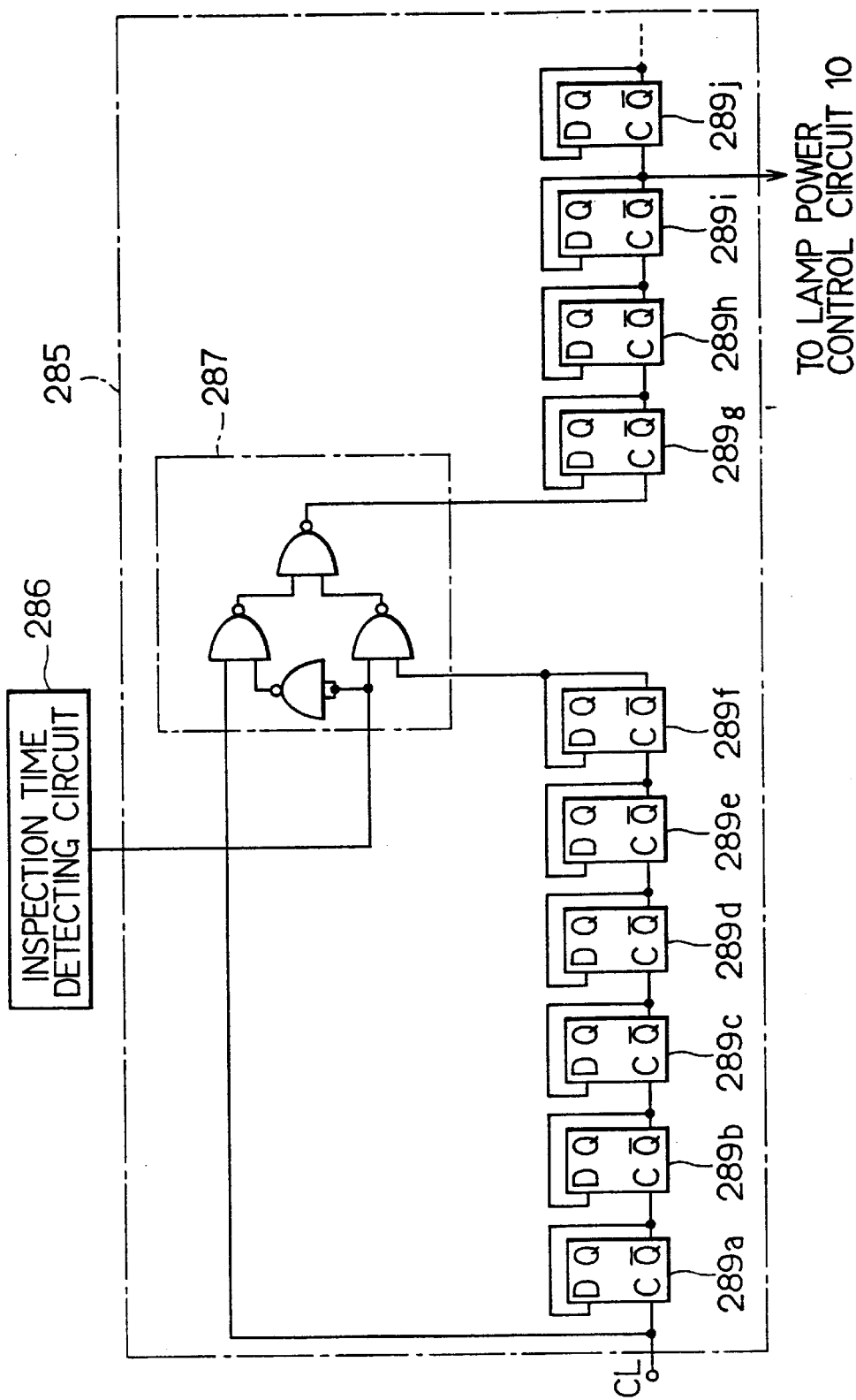
FIG. 24 is a circuit diagram of a clock circuit used in inspecting the discharge lamp device according to the embodiment.

As shown in FIG. 23 and FIG. 24, in order to pseudonymously shorten the frequency of a signal generated by the clock circuit 285 in inspection time, clock switch detecting circuits 286 and 287 are installed to the discharge lamp device.

The clock switch detecting circuits 286 and 287 are provided with the inspection time detecting circuit 286 for outputting a clock switch detecting signal by detecting inspection time and the time shortening circuit 287 for pseudonymously accelerating time counted by the clock circuit 285 based on the clock switch detecting signal.

The battery voltage VB applied to the connector detachment detecting terminal 261 is applied similarly on the inspection time detecting circuit 286. The connector detachment detection is carried out by the battery voltage VB and accordingly, voltage higher than the battery voltage VB is not applied to the connector detachment detecting terminal 261a. By utilizing this, when only voltage lower than the battery voltage VB+α is applied to the connector detachment detecting terminal 261a, the inspection time detecting circuit 286 outputs the high level signal as it is not the inspection time and when voltage equal to or higher than the battery voltage VB+α is applied to the connector detachment detecting terminal 261a, the inspection time detecting circuit 286 outputs the low level signal constituting the clock switch detecting signal. Thereby, the connector detachment detecting terminal 261a is used as a terminal commonly for inspection and for connector detachment detection.

The time shortening circuit 287 is incorporated in the clock circuit 285 as shown in FIG. 24. The clock circuit 285 is installed with a plurality of D-type flip-flops 289a–289j which are continuously lined up and time is counted by the D-20 type flip-flops 289a–289j. That is, when a clock signal CL outputted by a converter, not illustrated, is inputted to the D-type flip-flop 289a, the D-type flip-flop 289a outputs a signal having a period twice as much as the clock signal and the successive D-type flip-flop 289b outputs a signal having a further doubled period. The operation is repeated at the respective D-type flip-flops 289a–289j and the period of the clock signal is successively doubled. Further, each of the control circuits selects a suitable one among the signals outputted from the respective D-type flip-flops 40a–401j and uses it for time in carrying out each control. For example, in the case of the lamp power control circuit 10, control time is set based on the frequency of the output signal from the D-type flip-flop 289i.

The time shortening circuit 287 is arranged among the plurality of D-type flip-flops which are lined up in this way. In the following, an explanation will be given of operation at the clock circuit 285 and the clock switch detecting circuits 287a and 287 with regard to when the lamp 2 is actually used and with regard to inspection time.

(1) When lamp 2 is actually used:

In this case, the lamp 2 is connected to the connector 35 and accordingly, the clock switch detecting circuits 287a and 287 are brought into a grounded state. In this case, voltage which is equal to or higher than the battery voltage VB+α is not applied to the connector detachment detecting connection terminal 261a and accordingly, the inspection time detecting circuit 286 outputs the high level signal.

In this case, the output signal from the D-type flip-flop 289f is inputted to the clock C of the D-type flip-flop 289g. That is, by the processing at the time shortening circuit 287, the clock signal outputted from the converter is disregarded and the output signal from the D-type flip-flop 289f is inputted to the clock C as the clock signal of the D-type flip-flop 289g. Accordingly, other than the inspection time, the period of the clock signal CL from the converter is successively doubled via the D-type flip-flops 289a–289f and the signal having the successively doubled period constitutes the clock signal of the D-type flip-flop 289g. Accordingly, the lamp power control circuit 10 carries out lamp power control by normal time.

Even when the lamp 2 is detached from the connector 35, only the battery voltage VB is applied to the clock switch detecting circuits 287a and 287 and accordingly, the inspection time detecting circuit 286 outputs the high level signal and the clock circuit 285 and the clock switch detecting circuits 287a and 287 carry out operation similar to the above-described.

(2) Inspection Time

In this case, the connector detachment detecting terminal 261a is used as a terminal commonly for inspection and for connector detachment inspection. Further, voltage similar to the battery voltage is applied to a portion connecting the battery by using a predetermined power source. Thereby, the battery voltage VB is applied to the connector detachment detecting terminal 261a. At this stage, the inspection time detecting circuit 286 outputs the high level signal.

Then, voltage which is equal to or higher than the battery voltage VB+α is applied to the connector detachment detecting terminal 261a. Thereby, the inspection time detecting circuit 286 outputs the low level signal as a signal for detecting clock switching.

In this case, the clock signal from the converter is directly inputted to the clock C of the D-type flip-flop 289g. That is, by the processing at the time shortening circuit 287, the signal outputted from the D-type flip-flop 289f is disregarded and the clock signal from the converter is inputted as the clock of the D-type flip-flop 289g. Accordingly, in the inspection time, the clock signal from the converter constitutes the clock signal of the D-type flip-flop 289g as it is without being processed through the D-type flip-flops 289a–289f. Therefore, the D-type flip-flop 289g constitutes a signal having a period twice as much as the period of the clock signal from the converter and outputs it.

Accordingly, the periods of the output signal at the D-type flip-flops 289g–289j after the time shortening circuit 287, that is, time periods for constituting references of the respective control circuits 9–15 are pseudonymously shortened and the respective control circuits 9–15 carry out the lamp power control based on the shortened time periods. Therefore, the lamp power control time is shortened.

In this way, when the voltage VB which is equal to or higher than the voltage used in detecting connector detachment is applied to the connector detachment detecting terminal 261a, the inspection time detecting circuit 286 detects the inspection time and in this case, the respective control circuits 9–15 carry out respective control based on the time periods shortened by the time shortening circuit 287.

Thereby, the time periods of control performed by the respective control circuits 9–15 can be shortened and the inspection time can be shortened. Further, the connector detachment detecting terminal 261a is used as the terminal for inputting the clock switch signal to the time shortening circuit 287 and accordingly, it is not necessary to form a terminal only for inputting the clock switch signal. The connector detachment detecting terminal 261a is covered with the lamp when the lamp 2 is connected and accordingly, no special treatment is not needed for rust prevention.

(Second Embodiment)

Although the capacitor 53 is charged at the intermediary potential point of the H-bridge circuit 7a in the first embodiment, the capacitor is charged directly from the secondary side voltage of the flyback transformer 29 without through the H-bridge circuit 7a in the second embodiment.

Figure 25:
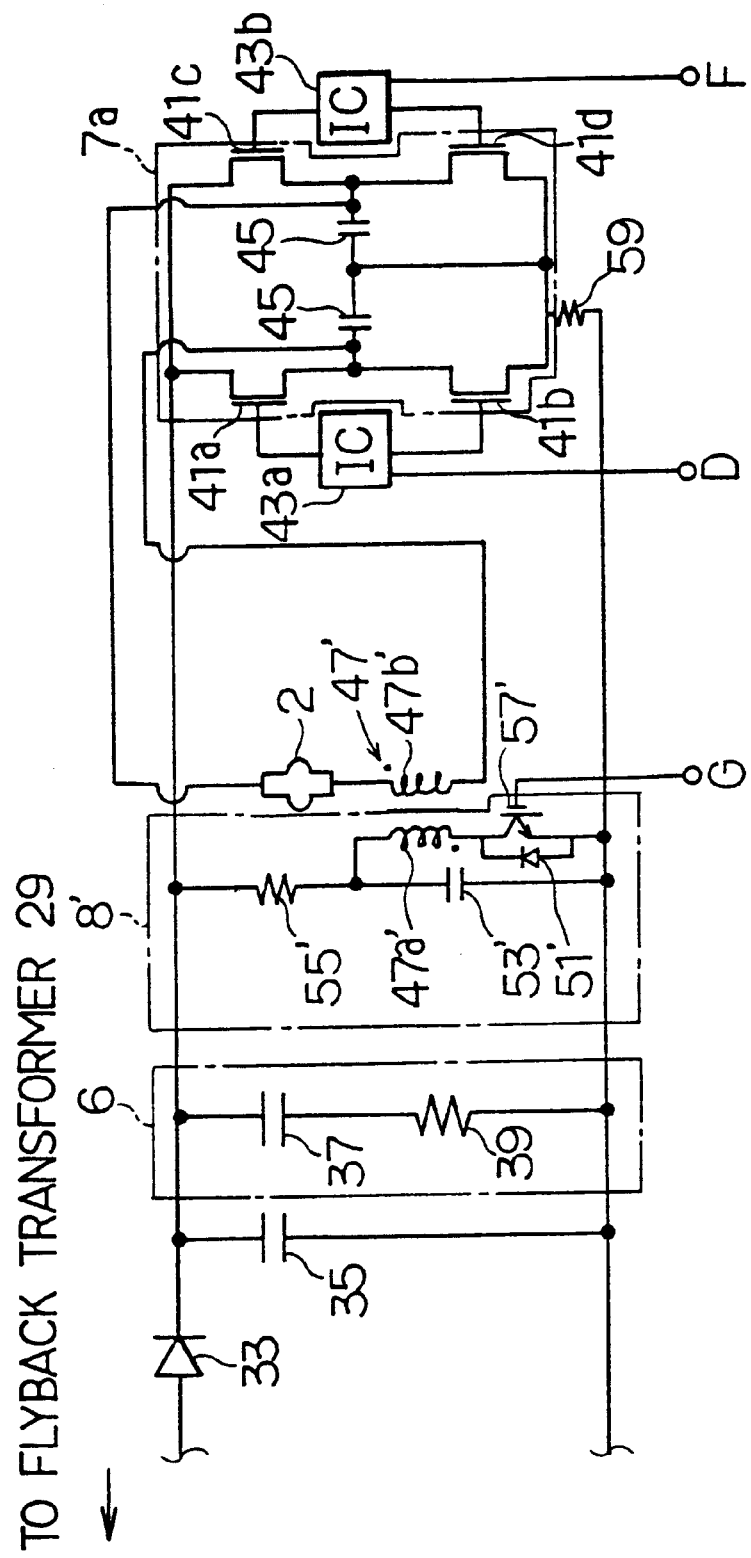
FIG. 25 is a circuit diagram of a discharge lamp device according to a second embodiment.
Figure 26:
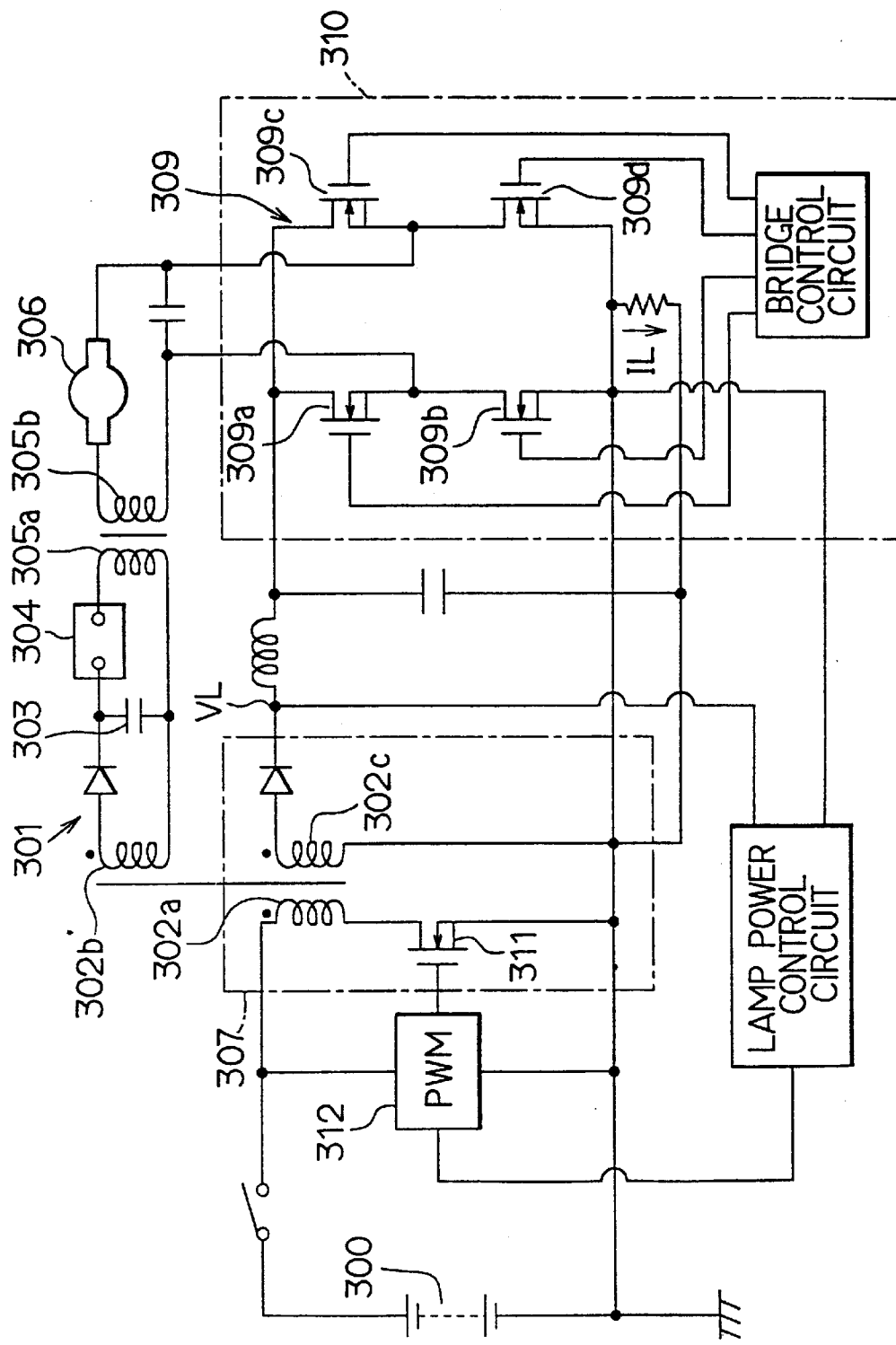
FIG. 26 is a circuit diagram of a proposed discharge lamp device.

Only the secondary side of the flyback transformer 29 of the second embodiment is illustrated in FIG. 25. Other circuits similar to those in FIG. 1 are connected with notations similar to those in FIG. 1.

As shown in FIG. 25, a starting circuit 8' is connected in parallel with the takeover circuit 6 and the starting circuit 8' is driven by directly applying the lamp voltage. The starting circuit 8' is constituted by a transformer 47' comprising a primary winding 47a' and a secondary winding 47b', a diode 51', a capacitor 53', a resistor 55+, and IGBT 57' which is a one-directional semiconductor element.

When the on/off switch SW is turned on, predetermined power supply is carried out from the primary side of the battery 1 to the secondary side via the flyback transformer 29 and the capacitor 53' starts charging. In this case, the capacitor 53' is charged based on the lamp voltage VL that is directly applied.

Further, when the signal for driving the gate of IGBT 57', is changed to the high level signal in synchronism with on/off switch of the MOS transistors 41a–41d in the H-bridge circuit 7a, IGBT 57' is turned on and the capacitor 53 is discharged via the primary winding 47a' of the transformer 47'. Thereby, high voltage is generated at the secondary winding 47b' and applied to the lamp 2 and the lamp 2 is turned on by causing dielectric breakdown between electrodes.

Further, IGBT 57' is turned on by making the gate drive signal at high level only when the high voltage is generated and turned off at low level.

In this way, the capacitor 53' may be charged by the lamp voltage VL applied to the flyback transformer 29 without through the H-bridge circuit 7a.

Here, it is assumed that IGBT 57' is replaced by a thyristor in this embodiment. When IGBT 57' is replaced by a thyristor, as shown in the first embodiment, the thyristor must be turned off from the necessity of recharging the capacitor 53' in the case where the lamp 2 is not turned on at the first period of On/off switch of the MOS transistors 41a–41d, however, according to the starting circuit 8' in this embodiment, the condition of turning off the thyristor cannot be satisfied and the thyristor cannot be turned off. That is, the reason is that the lamp voltage VL is necessarily higher than the voltage of the ground terminal 1b.

Further, although it is possible to adopt the circuit constitution satisfying the condition of turning off the thyristor, the circuit construction is likely to become complicated. Further, when the circuit constitution to which the thyristor is applicable, it is necessary that a gate drive signal having an extremely short pulse is outputted by the high voltage generation control circuit in order to turn off the thyristor and there may occurs a problem where the circuit constitution for generating such a short pulse also becomes extremely complicated.

Accordingly, as shown in the second embodiment, by using IGBT 57', the capacitor 53' of the starting circuit 8' can be charged by the lamp voltage applied to the secondary side of the flyback transformer 29 easily without through the H-bridge circuit 7a.

(Other Embodiments)

Although the thyristor 57 is used as a semiconductor switch element, IGBT or MOS transistors may be used in place of the thyristor 57.

Further, although the diode 51 is connected in parallel with the thyristor 57 in order to prolong the spark discharge current duration time, the diode 51 may be dispensed with.

Further, although the NPN transistors 112 and 113 are driven by the first power source circuit 96 or the second power source circuit 110 in accordance with a large or small relationship between the predetermined voltage V3 and the predetermined voltage V4, the NPN transistors 112 and 113 may be driven always by the first power source circuit 96.

Further, although the MOS transistor 31 is used as a switching element for the primary side, for example, IGBT (insulated type bipolar NPN transistor) may be used.

Further, although the NPN transistors 112 and 113 connected in Darlington connection are used as the driving switching elements, the Darlington connection may be formed by an NPN transistor and a PNP transistor. The NPN transistors 112 and 113 in Darlington connection are used as the driving switching elements, the Darlington connection is not necessarily needed.

Further, although the potential V1 is prevented from becoming the predetermined voltage Vref-α by the clamp circuit 69 by which the change of the lamp current IL in switching the MOS transistors 41a–41d is restrained from influencing on the power control, a similar effect can be achieved also by installing to the lamp power control circuit 10, the sample hold circuit 12 where the lamp current IL is masked only at moments where the lamp current IL is abruptly lowered and the lamp current IL is prevented from sampling at that time, in place of the clamp circuit 69.

Further, although the frequency of switching the MOS transistor 31 is linearly lowered when the battery voltage VB is lowered, the switching frequency may be changed in steps.

Although the lamp voltage VL is used as information indicating power supplied to the lamp 2, the information may be, for example, the lamp current IL and any information may be used so far as it is information indicating power supplied to the lamp 2.

Although the lamp voltage VL and the lamp current IL are used for determining the abnormal state, for example, a voltage detecting circuit and a current detecting circuit may separately be installed at different positions of detecting the lamp voltage VL and the lamp current IL.

Further, the H-bridge circuit 7a is turned off when the electric wiring portion 239 is grounded, in the case where both ends of the lamp 2 are short-circuitted, overcurrent larger than a predetermined value may be supplied in the H-bridge circuit 7a. Accordingly, when the short-circuit between the both ends of the lamp 2 is detected and the H-bridge circuit 7a is turned off at this moment, the H-bridge circuit 7a and the like can be protected.

Further, although the PWM control circuit 9 stops controlling, the control need not stop controlling necessarily.

Further, although the flyback transformer 29 comprising the primary winding 29a and the secondary winding 29b are used as the transformer, any type of a transformer may be used so far as the primary winding 29a and the secondary winding 29b are electrically conductible.

Although the IC elements 43a and 43b are used as the bridge drive circuit for driving the H-bridge circuit 7a, for example, an insulated type bipolar transistor or the like may be used.

Further, although the case of using the transformer 29 for storing energy in the primary winding 29a in flowing the primary current and supplying energy to the secondary side in interrupting the primary current is shown, an effect similar to that in the embodiment can be achieved by lowering the switching frequency of the primary current even in a transformer where a primary winding and a secondary winding are electrically blocked.

Still further, the present invention is not limited to the discharge lamp but may be applied to any other devices so far as they are electric devices mounted on a vehicle.

What is claimed is:

1. A discharge lamp device for turning on a discharge lamp by alternating current by converting power from a direct current power source into alternating current by an inverter circuit, the discharge lamp device comprising:
    a transformer in which a primary side connected to a side of the direct current power source and a secondary side connected to a side of the discharge lamp are electrically conducted;
    a bridge circuit having a plurality of switching elements connected to the secondary side of the transformer, constituting the inverter circuit, inverting alternately a direction of discharge current of the discharge lamp and arranged in an H-bridge shape; and
    a fail-safe circuit for interrupting conduction of all of the plurality of semiconductor switching elements for bridge when a predetermined abnormal state is detected;
    wherein the fail-safe circuit prevents a state where overcurrent larger than a predetermined value flows in the bridge circuit as the predetermined abnormal state;
    the fail-safe circuit detects grounding of an electric wiring portion between the bridge circuit and the discharge lamp as the predetermined abnormal state; and
    the fail-safe circuit detects lowering of a voltage signal between the transformer and the discharge lamp as compared with a predetermined voltage value and lowering of a current signal between the transformer and the discharge lamp as compared with a predetermined current value as the predetermined abnormal state.

2. A discharge lamp device comprising:
    a discharge lamp;
    a control circuit for controlling to turn on the discharge lamp;
    connector detachment detecting means having a connector detachment detecting terminal for detecting detachment of the discharge lamp from a connector for connecting the discharge lamp;
    switch detecting means for switching control states of the control circuit into control states for inspection when an inspection signal for inspecting the control states of the control circuits is inputted, wherein the connector detachment detecting means is capable of inputting the inspection signal from the connector detachment detecting terminal;
    a clock circuit for generating a signal having a predetermined period, wherein
    the control circuit controls to turn on the discharge lamp based on the signal generated by the clock circuit; and
    the switching means shortens the period of the signal generated by the clock circuit when the inspection signal is inputted from the connector detachment detecting terminal.

3. The discharge lamp device as in claim 2, wherein:
    the connector detachment detecting means detects the detachment of the connector when a voltage at the connector detachment detecting terminal reaches a voltage in correspondence with the detachment of the connector; and
    the switching means switches the control states when an inspection voltage different from the voltage in correspondence with the detachment of the connector is inputted from the connector detachment detecting terminal as the inspection signal.

4. A discharge lamp device comprising:
    a discharge lamp electrically connected to a power source through a connector;
    a starting circuit for turning on the discharge lamp by repeatedly applying a high voltage until the discharge lamp is turned on;
    power controlling means for controlling a power supplied from the power source to the discharge lamp;
    connector detachment detecting means for detecting detachment of the connector, wherein when the detachment of the connector is detected by the connector detachment detecting means, operation of the starting circuit is stopped and the power supplied to the discharge lamp is maintained to control by the power controlling means; and
    turn-on detecting means for detecting a turn-on state and a turn-off state of the discharge lamp, wherein
    the power is maintained to be supplied to the discharge lamp by the power controlling means when the discharge lamp is detected to turn on by the turn-on detecting means,
    the power is stopped to be supplied to the discharge lamp by the power controlling means when the discharge lamp is detected to turn off by the turn-on detecting means.

5. A discharge lamp device comprising:
    a discharge lamp electrically connected to a power source through a connector;
    a starting circuit for turning on the discharge lamp by repeatedly applying a high voltage until the discharge lamp is turned on;

power controlling means for controlling a power supplied from the power source to the discharge lamp;

connector detachment detecting means for detecting detachment of the connector, wherein when the detachment of the connector is detected by the connector detachment detecting means, operation of the starting circuit is stopped and the power supplied to the discharge lamp is maintained to control by the power controlling means;

a signal generating circuit for outputting a signal repeatedly applying a high voltage to the starting circuit until the discharge lamp is turned on;

a stopping circuit connected between the signal generating circuit and the starting circuit for changing a signal from the signal generating circuit into a signal forcibly stopping operation of the starting circuit when the detachment of the connector is detected.

6. The discharge lamp device as in claim 5, wherein:

the power is stopped to be supplied to the discharge lamp by the power controlling means when the detachment of the connector is detected and the discharge lamp continues to turn off for a predetermined time.

7. A discharge lamp device comprising:

a power source;

a discharge lamp;

a transformer comprising a primary side connected to a side of the power source and a secondary side connected on a side of the discharge lamp for transforming a power source voltage of the power source into a high voltage;

a switching element for the primary side for controlling a power of the discharge lamp by controlling a primary current of the transformer;

a drive circuit for driving the switching element for the primary side;

a first power source circuit connected on the secondary side of the transformer for changing a voltage on the secondary side into a first predetermined voltage, wherein the drive circuit is provided with a drive power source from the first power source circuit;

a second power source circuit connected on the primary side of the transformer and on the side of the power source for changing the power source voltage into a second predetermined voltage; and switching means for switching to provide the drive power source from the second power source circuit when the power source voltage is higher than a predetermined voltage and to provide the drive power source from the first power source circuit when the power source voltage is lower than the predetermined voltage.

8. The discharge lamp device as in claim 7, wherein:

the drive circuit includes at least a bipolar transistor;

the switching means includes diode means connected between the first power source circuit and the second power source circuit for flowing current only in one direction; and a collector current and a base current of the bipolar transistor is provided from the second power source circuit via the diode means when the second power source circuit generates the second predetermined voltage, and the base current is provided from the first power source circuit by the diode means and the collector current is provided from the second power source circuit when the power source voltage is lowered and the second predetermined voltage is lower than the first predetermined voltage.

9. A discharge lamp device comprising:

a direct current power source;

a discharge lamp;

an H-bridge circuit including four switching means integrated in an H-bridge shape for supplying power from the direct current power source to the discharge lamp by converting the power into alternating current by turning on and off the switching means by alternately switching ones of the switching means on diagonal lines, the power supplied from the direct current power source to the discharge lamp being controlled by a feedback control based on a signal in correspondence with a lamp current flowing in the discharge lamp; and means for maintaining the signal in correspondence with the lamp current to be above a predetermined value, wherein the signal maintaining means includes a clamp circuit for preventing the signal in correspondence with the lamp current from becoming lower than the predetermined value.

10. A discharge lamp device comprising:

a direct current power source;

a discharge lamp;

an H-bridge circuit including four switching means integrated in an H-bridge shape for supplying power from the direct current power source to the discharge lamp by converting the power into alternating current by turning on and off the switching means by alternately switching ones of the switching means on diagonal lines, the power supplied from the direct current power source to the discharge lamp being controlled by a feedback control based on a signal in correspondence with a lamp current flowing in the discharge lamp; and means for maintaining the signal in correspondence with the lamp current to be above a predetermined value;

wherein the signal maintaining means samples the signal in correspondence with the lamp current when a predetermined time has elapsed after switching the switching means.

11. A discharge lamp device comprising:

a direct current power source;

a discharge lamp;

a transformer having a primary side arranged on a side of the direct current power source and a secondary side arranged on a side of the discharge lamp;

a switching element for controlling primary current on the primary side of the transformer;

detecting means for detecting a signal indicating a turn-on state of the discharge lamp;

power controlling means for controlling power supplied to the discharge lamp by a feedback control by controlling a duty of the switching element based on the signal detected by the detecting means; and power information detecting means for detecting only information indicating the power supplied to the discharge lamp, wherein an upper limit value of a duty ratio of the duty control is variable with the information detected by the power information detecting means.

12. A discharge lamp device comprising:

a direct current power source;

a discharge lamp;

a transformer having a primary side arranged on a side of the direct current power source and a secondary side arranged on a side of the discharge lamp;

a switching element for controlling primary current on the primary side of the transformer;

detecting means for detecting a signal indicating a turn-on state of the discharge lamp;

power controlling means for controlling power supplied to the discharge lamp by a feedback control by controlling a duty of the switching element based on the signal detected by the detecting means; and power information detecting means for detecting only information indicating power source voltage of the direct current power source, wherein an upper limit value of a duty ratio of the duty control is variable with the information detected by the power source information detecting means.

13. The discharge lamp device as in claim 12, further comprising:

power information detecting means for detecting only information indicating power supplied to the discharge lamp, wherein an upper limit value of a duty ratio of the duty control is variable in accordance with the information detected by the power information detecting means.

14. A discharge lamp device for turning on a discharge lamp by alternating current by converting power from a direct current power source into alternating current by an inverter circuit, the discharge lamp device comprising:

a transformer in which a primary side connected to a side of the direct current power source and a secondary side connected to a side of the discharge lamp are electrically conducted;

a bridge circuit having a plurality of switching elements connected to the secondary side of the transformer, constituting the inverter circuit, inverting alternately a direction of discharge current of the discharge lamp and arranged in an H-bridge shape; and a fail-safe circuit for interrupting conduction of all of the plurality of semiconductor switching elements for bridge when a predetermined abnormal state is detected;

wherein the fail-safe circuit prevents a state where overcurrent larger than a predetermined value flows in the bridge circuit as the predetermined abnormal state;

the fail-safe circuit detects grounding of an electric wiring portion between the bridge circuit and the discharge lamp as the predetermined abnormal state;

the fail-safe circuit detects lowering of a voltage signal between the transformer and the discharge lamp as compared with a predetermined voltage value and lowering of a current signal between the transformer and the discharge lamp as compared with a predetermined current value as the predetermined abnormal state; and the fail-safe circuit detects that the state where the voltage signal is lower than the predetermined voltage value and the current signal is lower than the predetermined current value elapses for a predetermined time as the predetermined abnormal state.

15. The discharge lamp device as in claim 14, wherein:

the predetermined time is set to be smaller than switching time for alternately inverting a direction of the discharge current of the discharge lamp.

16. The discharge lamp as in claim 14, wherein:

the fail-safe circuit interrupts conduction of all of the plurality of semiconductor switching elements for bridge and interrupts conduction of a semiconductor switching element for primary side when the predetermined abnormal state is detected.

17. A discharge lamp device comprising:

a direct current power source;

a discharge lamp;

an H-bridge circuit connected with four switching means integrated in an H-bridge shape for supplying power supplied from the direct current power source to the discharge lamp by converting the power into alternating current by turning on and off the switching means by switching alternately ones on diagonal lines among the switching means; and means for controlling power supplied from the direct current power source to the discharge lamp based on lamp voltage applied to the H-bridge circuit, so that the discharge lamp is turned on by the alternating current by applying transient voltage on the discharge lamp when ON and OFF of the switching means are switched; and means for sampling the lamp voltage except time period where the transient voltage is generating.

18. The discharge lamp device as in claim 17, wherein:

the sampling means includes means for holding the lamp voltage before generation of the transient voltage in the case where the transient voltage is generated.

19. A discharge lamp device comprising:

a direct current power source;

a discharge lamp;

an H-bridge circuit connected with four switching means integrated in an H-bridge shape for supplying power supplied from the direct current power source to the discharge lamp by converting the power into alternating current by turning on and off the switching means by switching alternately ones on diagonal lines among the switching means; and means for controlling power supplied from the direct current power source to the discharge lamp based on lamp voltage applied to the H-bridge circuit, so that the discharge lamp is turned on by the alternating current by applying transient voltage on the discharge lamp when ON and OFF of the switching means are switched; and means for sampling the lamp voltage except time period where the transient voltage is generating;

wherein the sampling means includes means for masking the lamp voltage during the time period where the transient voltage is generating.

* * * * *